(12) United States Patent
Thomas et al.

(10) Patent No.: US 12,637,929 B2
(45) Date of Patent: May 26, 2026

(54) MANAGING REGENERATIVE ENERGY OF RECIPROCATING PUMPING UNIT

(71) Applicant: Weatherford Technology Holdings, LLC, Houston, TX (US)

(72) Inventors: Benson Thomas, Pearland, TX (US); Mohammed S. Arefeen, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 18/907,485

(22) Filed: Oct. 5, 2024

(65) Prior Publication Data

US 2026/0098459 A1     Apr. 9, 2026

Related U.S. Application Data

(60) Provisional application No. 63/703,359, filed on Oct. 4, 2024.

(51) Int. Cl.
E21B 43/12          (2006.01)
F04B 17/03          (2006.01)
(Continued)

(52) U.S. Cl.
CPC ............ E21B 43/126 (2013.01); F04B 17/03 (2013.01); F04B 47/02 (2013.01); F04B 47/022 (2013.01);
(Continued)

(58) Field of Classification Search
CPC ........ E21B 43/126; F04B 17/03; F04B 47/02; F04B 47/022; F04B 49/20; F04B 49/06; H02P 27/04
See application file for complete search history.

(56) References Cited

U.S. PATENT DOCUMENTS 4,145,161 A * 3/1979 Skinner .................. H02P 23/14
417/45
8,727,749 B2 5/2014 Beck et al.
(Continued)

FOREIGN PATENT DOCUMENTS

CN         101645689 A      2/2010
CN         111997569 A      11/2020
(Continued)

OTHER PUBLICATIONS

Int'l Search Report and Written Opinion in PCTUS2025044680 dated Dec. 15, 2025, 9 pages.
(Continued)

*Primary Examiner* — Charles G Freay
(74) *Attorney, Agent, or Firm* — Cabello Hall Zinda, PLLC

(57)          ABSTRACT

A variable frequency drive to drive an electric motor for a reciprocating pumping unit includes a rectifier, a filter, an inverter, and a capacitor bank. The rectifier converts AC power to DC power for filtering by the filter. The inverter converts the DC power to three-phase AC power for output to the electric motor. The capacitor bank has one or more capacitors connected to the DC bus. The capacitor bank can store regenerative power passed from the motor through the inverter and can supply the stored DC power to the DC bus to drive the electric motor. Control circuitry can control the speed of the electric motor provided by the variable frequency drive during strokes of the pumping unit. The control circuitry can pre-charge the capacitor bank from AC power. The control circuitry can detect any fault condition.

9 Claims, 12 Drawing Sheets

(51) Int. Cl.

| | |
|---|---|
| *F04B 47/02* | (2006.01) |
| *F04B 49/20* | (2006.01) |
| *H02P 27/04* | (2016.01) |
| *F04B 49/06* | (2006.01) |

(52) U.S. Cl.
CPC ............... *F04B 49/20* (2013.01); *H02P 27/04* (2013.01); *F04B 49/06* (2013.01)

(56) References Cited

U.S. PATENT DOCUMENTS

| | | | |
|---|---|---|---|
| 9,115,705 | B2 | 8/2015 | Best |
| 9,140,253 | B2 * | 9/2015 | Wentworth ............. F04B 49/20 |
| 9,279,838 | B2 | 3/2016 | DaCunha et al. |
| 9,628,016 | B2 | 4/2017 | Lamascus et al. |
| 9,638,194 | B2 | 5/2017 | Wiegman et al. |
| 10,113,544 | B2 | 10/2018 | Robison et al. |
| 10,208,748 | B2 * | 2/2019 | Tientcheu-Yamdeu ...................... F04C 14/28 |
| 10,400,761 | B2 | 9/2019 | Robison et al. |
| 10,890,175 | B2 | 1/2021 | Thomas et al. |
| 10,962,000 | B2 | 3/2021 | Robison et al. |
| 11,808,127 | B2 | 11/2023 | Coskrey et al. |
| 11,913,316 | B2 | 2/2024 | Coskrey et al. |
| 2020/0332791 | A1 * | 10/2020 | Arefeen .................. F04B 49/06 |
| 2022/0140764 | A1 * | 5/2022 | Arefeen .................. H02J 9/062 318/504 |
| 2023/0407862 | A1 | 12/2023 | Robison et al. |

FOREIGN PATENT DOCUMENTS

| | | |
|---|---|---|
| CN | 112211810 A | 1/2021 |
| CN | 114016960 A | 2/2022 |
| WO | WO 2011/056518 A3 * | 5/2011 |

OTHER PUBLICATIONS

Mohammed, A, A Dynamic Braking Resistor (DBR)—Less Variable Speed Drive (VSD) Solution for the Rod-Lift Systems, SPE 216942, dated Oct. 2, 2023, 9 pages.

* cited by examiner

*300*

Pre-charge DC capacitor bank of VFD
- disconnect DC capacitor bank from DC bus of VFD and connect pre-charging circuit to AC power source;
- convert, with the pre-charging circuit, AC power from AC power source to DC power at a target voltage level for DC capacitor bank; and
- disconnect pre-charging circuit from AC power source and connect DC capacitor bank to DC bus after pre-charging
*302*

Drive the electric motor after pre-charging the DC capacitor bank by:
*304*

Convert, in rectifier stage, AC power from AC power source to DC power for DC bus of VFD
*306*

Convert, in inverter stage, DC power on DC bus drawn from rectifier stage and DC capacitor bank to three-phase AC power for output to electric motor
*308*

Store, in DC capacitor bank, regenerative power passed from electric motor back through inverter stage to DC buss
- store regenerative power on DC bus from inverter stage as stored DC power in DC capacitor bank; and
- supply stored DC power to DC bus for conversion to the three-phase AC power to drive electric motor
*310*

Monitor one or more parameters of VFD and detect one or more fault conditions
*312*

CLT

S

104

RS
PT

PP
BL
PG
TV
SV

CS

MANAGING REGENERATIVE ENERGY OF RECIPROCATING PUMPING UNIT

CROSS-REFERENCE TO RELATED APPLICATIONS

This application claims the benefit of U.S. Provisional Appl. No. 63/703,359 filed Oct. 4, 2024, which is incorporated herein by reference in its entirety. This application is filed with U.S. Non-Provisional application Ser. No. 18/522, 707 filed Nov. 29, 2021, which claims the benefit of U.S. Provisional Appl. No. 61/601,747 filed Nov. 29, 2021, both of which are incorporated herein by reference in their entireties.

BACKGROUND OF THE DISCLOSURE

A reciprocating pump system, such as a sucker rod pump system, is a type of artificial lift system that extracts fluid from a well by employing a downhole pump connected to a driving source at the surface (i.e., a surface pumping unit). A rod string connects the surface pumping unit to the downhole pump in the well. When operated, the surface pumping unit cyclically raises and lowers the downhole pump, and with each stroke, the downhole pump lifts wellbore fluids toward the surface. A typical surface pumping unit for the driving source includes a beam-type pump jack unit, a long stroke pumping unit, a strap jack unit, and the like, which can use an electric motor to drive the unit.

During operation of the reciprocating pump system, the electric motor can act as a generator, producing regenerative energy. Traditional methods for handling regenerative energy from the electric motor of the reciprocating pump system can be ineffective and inefficient resulting in lost savings opportunities.

In one solution, a regenerative unit converts the regenerative energy back into the alternating current (AC) power for capture and reuse. The AC regeneration results in a large efficiency loss from the conversion process. In another solution, control of the reciprocating pump unit fluctuates the speed of the reciprocating pump unit during transitions of each stroke. Speeding through transitions of the pump strokes potentially causes inconsistent downhole performance and mechanical failures.

In the most common solution, a dynamic brake resistor can be used to burn off the regenerative energy as heat. As an example, FIG. 1A schematically illustrates a variable frequency drive 10 having a dynamic braking resistor 60 and being connected between a utility alternating (AC) power source (S) and an electric motor (140) for a reciprocating load, such as a reciprocating pump unit (not shown). The variable frequency drive 10 uses the dynamic braking resistor 50 to handle regenerative energy produced in the variable frequency drive 10 during operation of the electric motor (140) for the reciprocating pump unit.

As shown, the three-phase variable frequency drive (VFD) 10 includes a direct current (DC) line or DC bus 12, a rectifier stage 20, a DC bus filter 30, and an inverter stage 40. The variable frequency drive 10 can also be referred to as a variable speed drive (VSD). The rectifier stage 20 uses diodes 22 and converts three-phase AC input from the AC source (S) to a DC signal for the DC bus 12. The DC bus filter 30 smooths the DC signal on the DC bus 12. The inverter stage 40 has inverters 42 and converts the DC signal into a variable frequency AC voltage that controls the speed of the electric motor (140).

Overhauling or decelerating loads on the electric motor (140) can make the electric motor (140) turn faster than the synchronous speed set by the variable frequency drive 10. For example, the electric motor (140) draws/consumes the energy from the utility AC power source (S) during the up-stroke operation of the reciprocating pump unit, whereas the electric motor (140) generates energy during the down-stroke operation of the reciprocating pump unit. When this happens, the electric motor (140) acts as a generator, in which mechanical energy from the electric motor (140) is converted into regenerative energy. This regenerative energy flows back into the variable frequency drive 10 and increases the voltage of the DC bus 12. To prevent over-voltage of the DC bus 12, the regenerative energy needs to be dissipated or otherwise handled. In this typical implementation, the dynamic braking resistor 50 is used to dissipate the regenerative energy.

As shown, a brake chopper transistor 52 is connected to the DC bus 12. The brake chopper transistor 52 turns the dynamic braking resistor 50 continuously on and off in a duty cycle until the regenerative energy is dissipated as heat. When the voltage of the DC bus 12 exceeds a defined threshold, for example, the brake chopper transistor 52 closes or is "shunted" so current will flow across the dynamic brake resistor 50 where the electrical energy is converted to heat. Although using the dynamic brake resistor 50 is the most common approach, this arrangement experiences a short life expectancy and is an environmentally unfriendly waste of electrical energy.

Yet another solution available in the prior art to handle regenerative energy uses an on-site storage system that recycles unused energy from multiple reciprocating pump units. For example, FIG. 1B illustrates an installation of reciprocating pump systems (L) (shown here as having beam-type pump jack units) having an on-site storage system according to the prior art. Three reciprocating pump systems (L) are shown, each having a variable frequency drive 10 for an electric motor (140). Each of the variable frequency drives 10 connects to the utility AC power source (S) and powers the connected electric motor (140). The on-site storage system connects to the DC buses of these multiple variable frequency drives 10 and includes a capacitor-based storage unit 18.

A dynamic braking resistor 50 connects to a DC+ terminal and a brake terminal on each of the variable frequency drives 10. The DC+ terminal and the DC− terminal for each variable frequency drive 10 connect via a respective switch 14 to a shared combiner circuit 16. The DC terminals of the combiner circuit 16 connect to the DC terminals of the capacitor-based storage unit 18, which also connects to the utility AC power source (S) via a switch 15.

As the variable frequency drives 10 operate, any regenerative energy produced by one variable frequency drive 10 is first shared with the other variable frequency drives 10 as needed. The variable frequency drives 10 do not operate synchronously so regenerative energy produced in one variable frequency drive 10 during a down-stroke operation can be used by another of the variable frequency drives 10 during its up-stroke operation. Only excess regenerative energy that has not been used by the other variable frequency drives 10 is stored in the capacitor-based storage unit 18.

Although this arrangement offers specific benefits, each of the variable frequency drives 10 of the reciprocating pump systems (L) still use a dynamic braking resistor 50. The dynamic braking resistors 50 are still needed on the variable frequency drives 10 because a fault caused in any one of the variable frequency drives 10 would affect the entire system. To avoid this, the dynamic braking resistor 50 for each given variable frequency drive 10 can reduce the chances of a fault occurring on the given variable frequency drive 10 so effects on the entire system of the variable frequency drives 10 can be avoided.

The subject matter of the present disclosure is directed to overcoming, or at least reducing the effects of, one or more of the problems set forth above.

SUMMARY OF THE DISCLOSURE

A variable frequency drive is used with an alternating current (AC) power source and an electric motor of a reciprocating load device. The variable frequency drive comprises: an input, an output, a rectifier stage, a direct current (DC) buss filter, and inverter stage, a DC capacitor bank, and control circuitry.

The input is configured to connect to the AC power source, and the output is configured to connect to the electric motor. The rectifier stage is connected to the input and is configured to convert AC power from the AC power source to direct current (DC) power on a DC bus. The DC bus filter is connected between the DC bus and is configured to filter the DC power of the DC bus. The inverter stage is connected to the DC bus and is configured to convert the DC power to three-phase AC power for the output to the electric motor.

The DC capacitor bank has one or more capacitors connected to the DC bus. The DC capacitor bank is configured to store regenerative power on the DC bus from the inverter stage as stored DC power, and the DC capacitor bank is configured to supply the stored DC power to the DC bus for conversion to the three-phase AC power to drive the electric motor. The control circuitry is configured to pre-charge the one or more capacitors of the DC capacitor bank from the AC power of the AC power source. The control circuitry is configured to monitor one or more parameters of the variable frequency drive and is configured to detect one or more fault conditions associated with the one or more parameters.

The three-phase AC power to drive the electric motor can be drawn from both the DC capacitor bank and from the AC power source. Each of the one or more capacitors of the DC capacitor bank can comprise a nickel oxide hydroxide high amperage capacitor.

The control circuitry can comprise a current sensor being configured measure a current level associated with the DC capacitor bank. The control circuitry can be configured to monitor the current level measured by the current sensor and can be configured to detect a current fault based on the current level as one of the one or more fault conditions.

The control circuitry can comprise a temperature sensor being configured measure a temperature level associated with the DC capacitor bank. The control circuitry can be configured to monitor the temperature level measured by the temperature sensor and can be configured to detect a temperature fault based on the temperature level as one of the one or more fault conditions.

The DC bus can lack a chopper circuit and a dynamic braking resistor.

The control circuitry can comprise a pre-charging circuit being selectively connectable to the AC power of the AC power source. The pre-charging circuit can have diode pairs configured to convert the AC power from the AC power source to the DC power for the DC capacitor bank. For example, the pre-charging circuit can comprise a converter receiving a three-phase line voltage and converting the three-phase line voltage to a single-phase DC voltage that charges the DC capacitor bank. Additionally, the control circuitry can comprise charging contacts and an operating contact. The charging contacts can be selectively connected between the AC power at the input and the pre-charging circuit, and the operating contact can be selectively connected between a positive line of the DC capacitor bank and the DC bus. The control circuitry can be operable in a pre-charging mode to selectively close the charging contacts and open the operating contact and can be operable in an operating mode to selectively open the charging contacts and close the operating contact.

In particular, the pre-charging circuit can connect to the input of the variable frequency drive having the AC power of the AC power source; and the pre-charging contacts can be configured to selectively connect between (a) an opened state in which the pre-charging circuit is electrically disconnected from the input, and (b) a closed state in which the pre-charging circuit is electrically connected to the input.

In particular, the operating contact can be configured to selectively connect between (a) an opened state in which the DC capacitor bank is electrically disconnected from the DC bus, and (b) a closed state in which the DC capacitor bank is electrically connected to the DC bus.

In conjunction with the pre-charging circuit, charging contacts, and operating contact, the control circuitry can comprise a voltage sensor being configured measure a voltage level associated with the DC capacitor bank. In this case, the control circuitry in the operating mode can be configured to monitor the voltage level measured by the voltage sensor of the DC bus as one of the one or more parameters of the variable frequency drive. In turn, the control circuitry can be configured to detect a voltage fault based on the voltage level as one of the one or more fault conditions. Additionally, the control circuitry in the pre-charging mode can be configured to monitor the voltage level measured by the voltage sensor of the DC capacitor bank. In turn, the control circuitry can be configured to detect pre-charging of the DC capacitor bank to a predefined voltage threshold.

In conjunction with the pre-charging circuit, charging contacts, and operating contact, the control circuitry can comprise a current sensor being configured measure a current level associated with the DC capacitor bank. In this case, the control circuitry in the operating mode can be configured to monitor the current level measured by the current sensor of the DC bus as one of the one or more parameters of the variable frequency drive. In turn, the control circuitry can be configured to detect a current fault based on the current level as one of the one or more fault conditions.

In conjunction with the pre-charging circuit, charging contacts, and operating contact, the control circuitry can comprise a temperature sensor being configured measure a temperature level associated with the DC capacitor bank. In this case, the control circuitry in the operating mode can be configured to monitor the temperature level measured by the temperature sensor as one of the one or more parameters of the variable frequency drive. In turn, the control circuitry can be configured to detect a temperature fault based on the temperature level as one of the one or more fault conditions.

The control circuitry comprises a voltage sensor being configured measure a voltage level associated with the DC capacitor bank; and wherein the control circuitry is configured to monitor the voltage level measured by the voltage sensor and is configured to detect a voltage fault based on the voltage level as one of the one or more fault conditions.

A reciprocating pump unit disclosed herein can be used with an AC power source. The reciprocating pump unit can comprise: an electric motor; and a variable frequency drive as described above.

A method disclosed herein is used with a variable frequency drive. The variable frequency drive is connected to an alternating (AC) power source and is configured to drive an electric motor. The method comprises: pre-charging a direct current (DC) capacitor bank of the variable frequency drive; and driving the electric motor after pre-charging the DC capacitor bank by: converting, in a rectifier stage, AC power from the AC power source to DC power for a DC bus of the variable frequency drive; converting, in an inverter stage, the DC power on the DC bus drawn from the rectifier stage and the DC capacitor bank to three-phase AC power for output to the electric motor; and storing, in the DC capacitor bank, regenerative power passed from the electric motor back through the inverter stage to the DC bus.

In the method, pre-charging the DC capacitor bank can comprise: disconnecting the DC capacitor bank from the DC bus of the variable frequency drive and connecting a pre-charging circuit to the AC power source; converting, with the pre-charging circuit, AC power from the AC power source to the DC power at a target voltage level for the DC capacitor bank; and disconnecting the pre-charging circuit from the AC power source and connecting the DC capacitor bank to the DC bus after pre-charging the DC capacitor bank to the target voltage level.

In the method, storing the regenerative power in the DC capacitor bank can comprise: storing the regenerative power on the DC bus from the inverter stage as stored DC power in the DC capacitor bank; and supplying the stored DC power to the DC bus for conversion to the three-phase AC power to drive the electric motor.

The method can further comprise: monitoring one or more parameters of the variable frequency drive; and detecting one or more fault conditions associated with the one or more parameters being monitored. In this case, pre-charging the DC capacitor bank of the variable frequency drive can comprise: measuring one or more of a voltage level, a current level, and a temperature level associated with the DC capacitor bank as the one or more parameters; and detecting, based on the measurement, one or more of a voltage fault, a current fault, and a temperature fault as the one or more fault conditions. Also in this case, driving the electric motor can comprise: measuring one or more of a voltage level, a current level, and a temperature level associated with the DC bus as the one or more parameters; and detecting, based on the measurement, one or more of a voltage fault, a current fault, and a temperature fault as the one or more fault conditions.

The foregoing summary is not intended to summarize each potential configuration or every aspect of the present disclosure.

BRIEF DESCRIPTION OF THE DRAWINGS

FIG. 4 illustrates a flowchart of a process used with a control apparatus of the present disclosure.

DETAILED DESCRIPTION OF THE DISCLOSURE

Figure 1A:
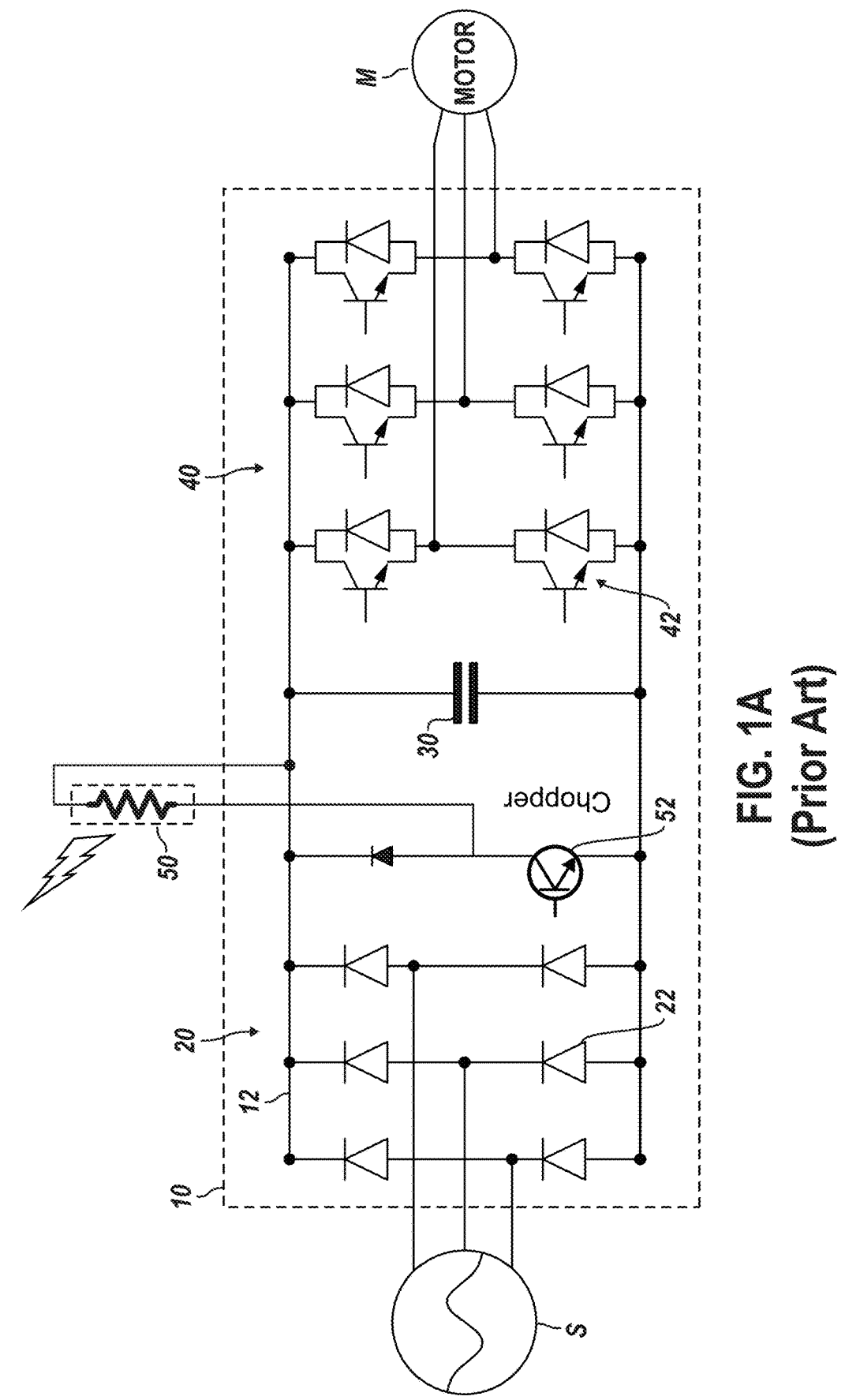
FIG. 1A schematically illustrates a variable frequency drive having a dynamic braking resistor and being connected between a utility AC power source and an electric motor for a reciprocating pump unit.
Figure 1B:
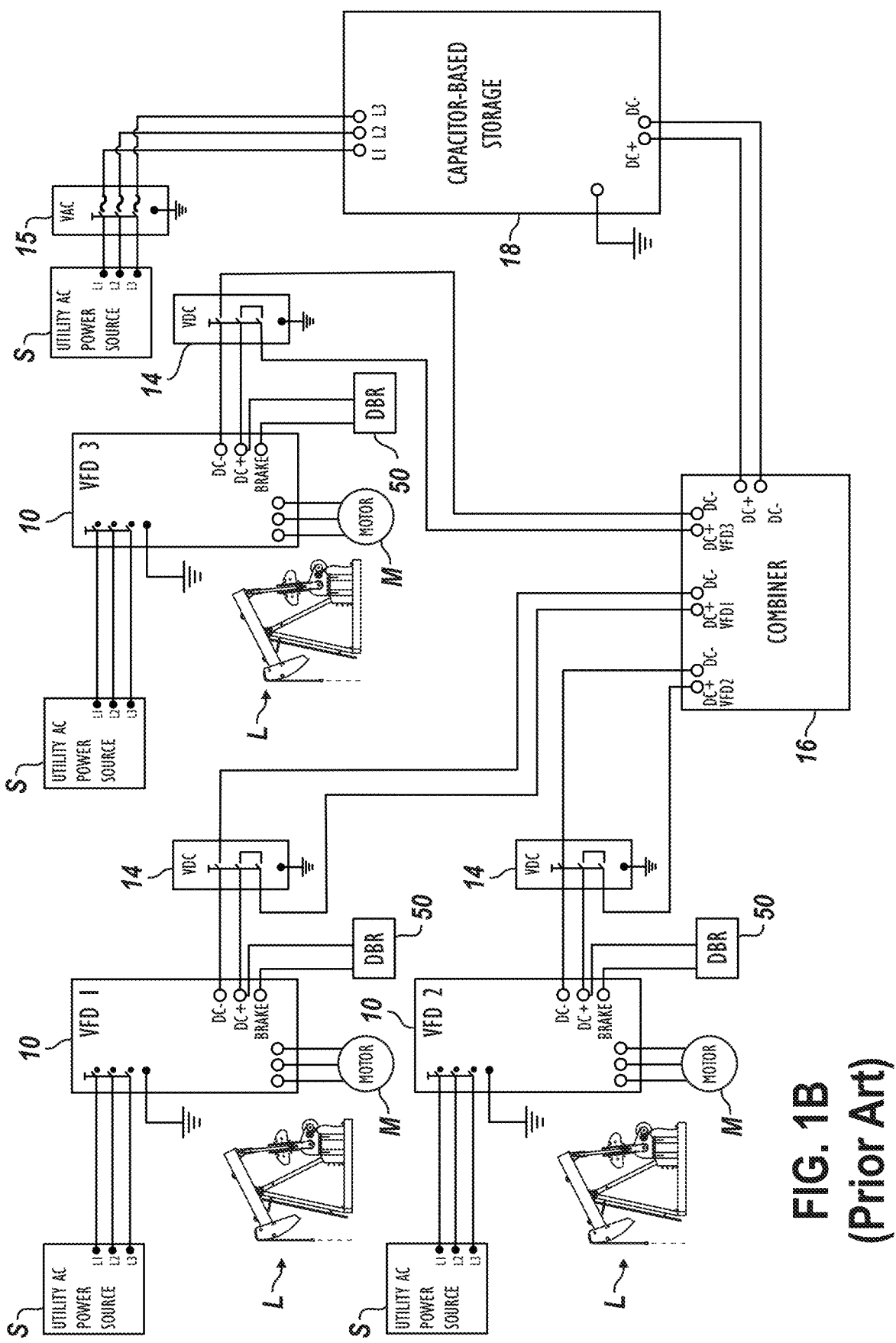
FIG. 1B illustrates an installation of reciprocating pump systems having an on-site storage system according to the prior art.
Figure 2:
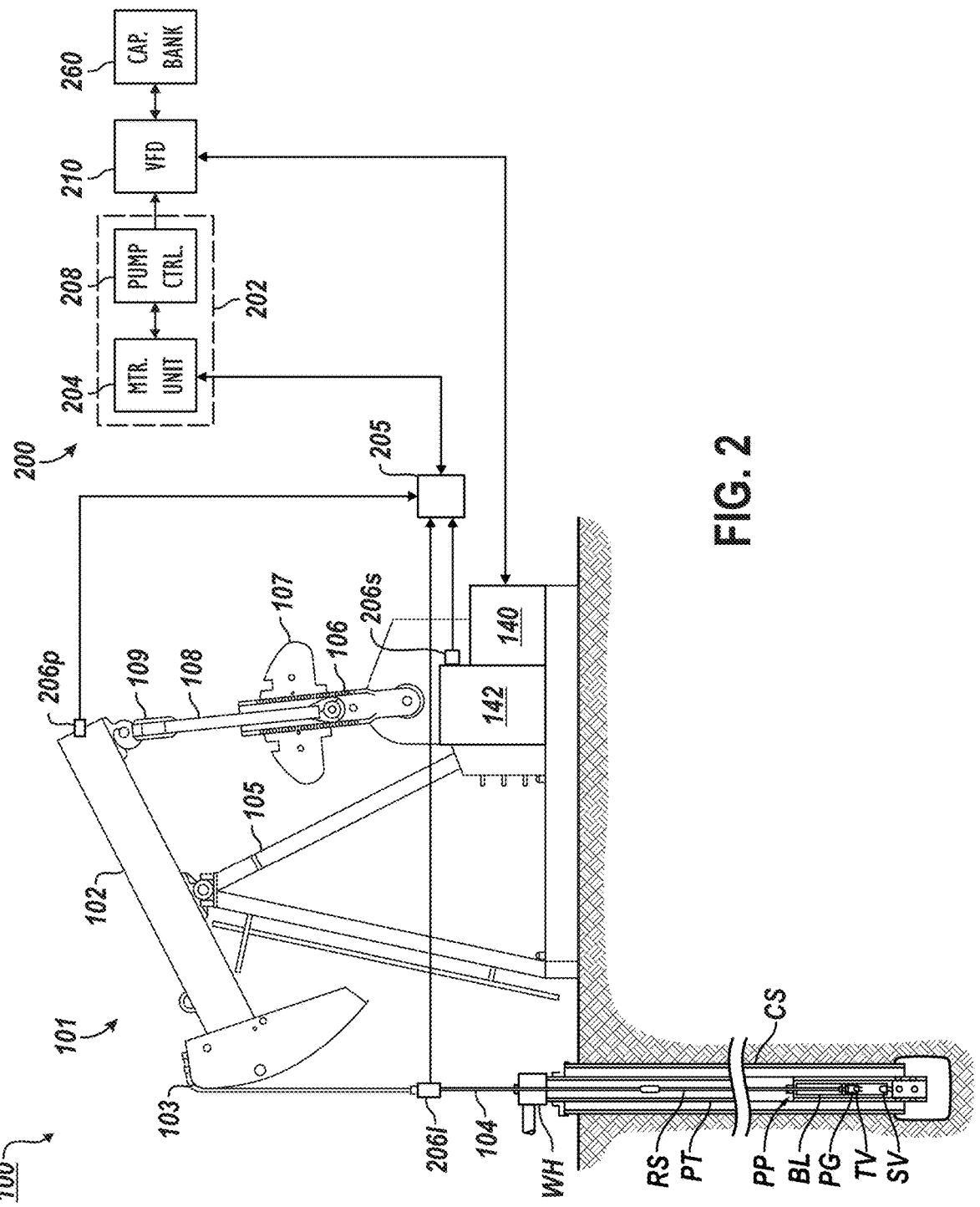
FIG. 2 illustrates a reciprocating pump system having a pumping unit and a control apparatus according to the present disclosure.

FIG. 2 illustrates a reciprocating pump system 100 having a reciprocating pumping unit 101 and a control apparatus 200 according to the present disclosure. In this example, the reciprocating pumping unit 101 is a beam-type pump jack unit having a walking beam 102. A Samson post 105 provides a fulcrum on which the walking beam 102 is pivotally supported by a saddle bearing assembly. A horse-head 103 is mounted to the forward end of the walking beam 102 and connects to a polished rod 104 and a rod string RS to a downhole pump PP.

Output from an electric motor 140 is transmitted to a gearbox or reducer 142, which provides low-speed, high-torque rotation of a crankshaft. Both ends of the crankshaft rotate crank arms 106 (one crank arm 106 is shown in FIG. 2 and the other crank arm is not visible). The crank arms 106 have counterbalance weights 107, and each crank arm 106 is pivotally connected to a pitman arm 108 by a crank pin bearing. In turn, the two pitman arms 108 are connected to an equalizer bar 109, which is pivotally connected to the rear end of the walking beam 102 by a bearing assembly.

As shown, the downhole pump PP includes a plunger PG having a traveling valve TV and includes a barrel BL having a standing valve SV. The plunger PG is reciprocated by the rod string RS in the barrel BL to lift fluid up a production tubing PT in the well.

Figure 3:
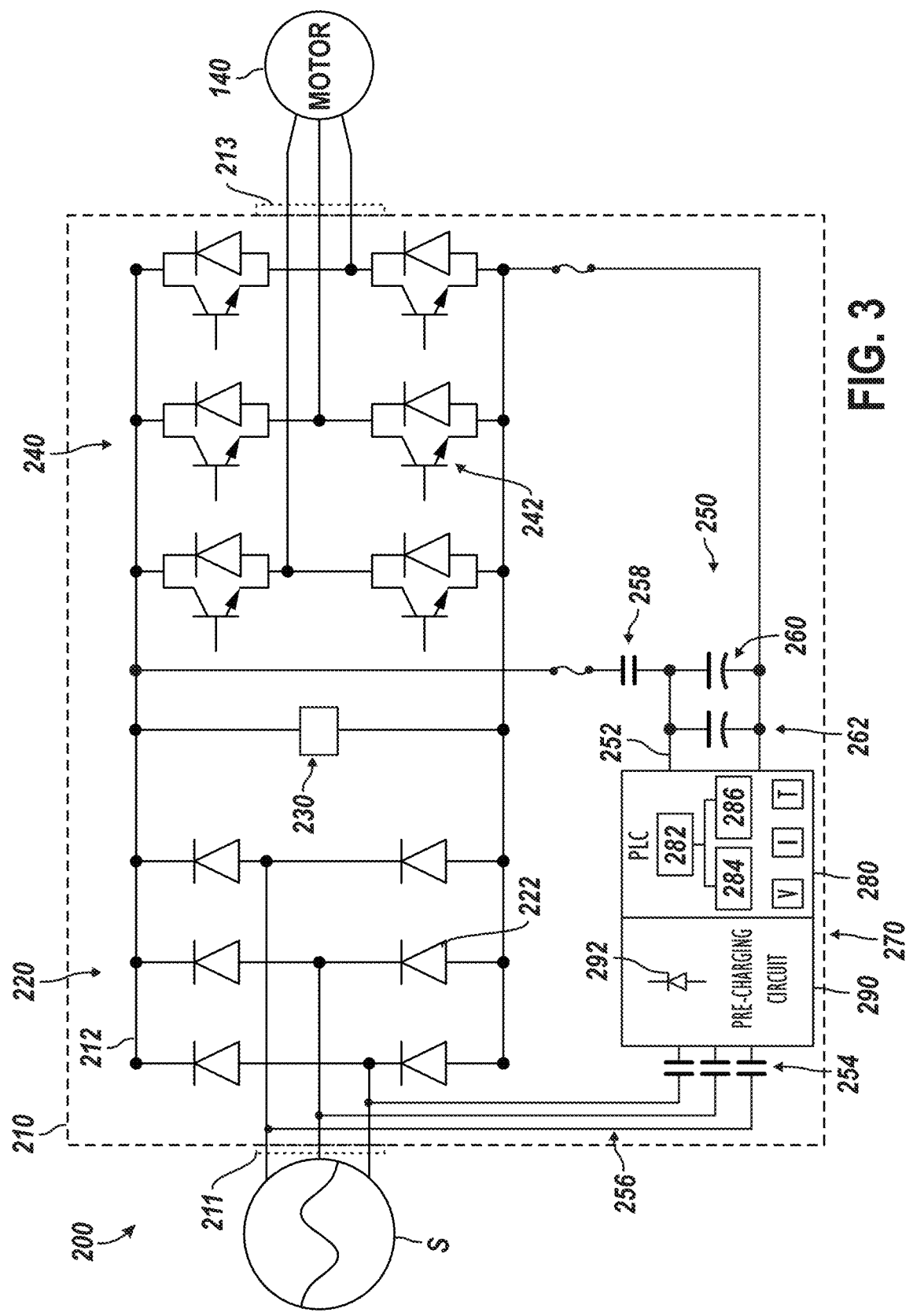
FIG. 3 schematically illustrates a control apparatus of the present disclosure, being connected between a utility AC power source and an electric motor for a reciprocating pump system and having a variable frequency drive and associated capacitor-based storage.

The control apparatus 200 for the surface pumping unit 101 can include components as shown in FIG. 3, which are incorporated here. As generally shown in FIG. 2, the control apparatus 200 includes control circuitry 202, a variable frequency drive 210, and a capacitor bank 260. The control apparatus 200 also includes a position sensor 206p, a load sensor 2061, and a speed sensor 206s. These and other sensor arrangements can be used.

The control circuitry 202 may include a programmable logic controller (PLC), an application-specific integrated circuit (ASIC), a field-programmable gate array (FPGA), or another type of computerized control device. As disclosed herein, components of the control apparatus 200, such as the control circuitry 202, the variable frequency drive, and the capacitor bank 260, can be integrated together and combined into one physical control unit or apparatus. Alternatively, one or more these components can be separate elements operably connected to other elements.

The electric motor 140 can be an induction motor, a switched reluctance motor, a permanent magnet motor, a brushless direct current motor, or other type of electric device. The variable frequency drive 210 is in electrical communication with the electric motor 140. The variable frequency drive 210, which acts as a variable speed driver, includes a rectifier and an inverter. The variable frequency drive 210 receives a three-phase alternating current (AC) power signal from a three-phase power source, such as a generator or transmission lines. The rectifier converts the three phase AC power signal to a direct current (DC) power signal, and the inverter modulates the DC power signal to drive each phase of the electric motor 140 based on speed instructions from the control apparatus 200. A voltmeter and/or an ammeter may be connected to the variable frequency drive 210 or between the variable frequency drive 210 and the three-phase power source for measuring electrical power consumed by the variable frequency drive 210 from the three-phase power source.

As described in more detail below, the control circuitry 202 can include a monitoring function or unit 204 and a pump controller function or unit. A junction box 205 can be used to connect the control circuitry 202 to the sensors 206r, 206l, 206p. Based on sensor measurements, the control circuitry 202 controls the variable frequency drive 210 to drive the pumping unit's electric motor 140 to achieve operational objectives. Electric power generated by the electric motor 140 during particular sections of the unit's stroke cycles is converted to usable power for storage by the capacitor bank 260. In turn, the capacitor bank 260 may then return stored power to the variable frequency drive 210 during other sections of the unit's stroke cycles, thereby lessening the demand on the three-phase power source. For the beam-type surface pumping unit 101 shown here, for example, the electric power generated by the electric motor 140 during the unit's downstroke may be converted to usable power for storage by the capacitor bank 260, while the capacitor bank 260 may then return stored power to the variable frequency drive 210 during the unit's upstroke, thereby lessening the demand on the three-phase power source.

FIG. 3 schematically illustrates a control apparatus 200 having a variable frequency drive 210 connected between a utility AC power source (S) and an electric motor (140) for a load (not shown)—i.e., a reciprocating pumping unit. In this example, the control apparatus 200 is integrated, combining the variable frequency drive 210 with capacitor-based storage 250. As shown, the capacitor-based storage 250 includes a capacitor bank 260 and control circuitry 270.

The variable frequency drive 210 is configured to condition input electrical power from the AC power source (S) and to deliver power to the electric motor (140) of the load, which can be a device that undergoes reciprocating motion, such as a reciprocating load device like a reciprocating pump unit, a beam-type pump jack, a rod pumping unit, a long stroke pumping unit, a strap jack unit, etc. Aspects of the present disclosure have particular applicability to loads that produce regenerative energy in the electric motor (140) during operation.

As shown in FIG. 3, the variable frequency drive 210 is a three-phase variable frequency drive. The variable frequency drive 210 includes a DC line or DC bus 212, a rectifier stage 220, a DC bus filter 230, an inverter stage 240. An input 211 of the variable frequency drive 210 is configured to connect to the utility AC power source (S), and an output 213 of the variable frequency drive 210 is configured to connect to the electric motor (140).

Briefly, the rectifier stage 220 is connected to the input 211 and is configured to convert AC power from the AC power source (S) to DC power on the DC bus 212. The DC bus filter 230 is connected between the DC bus 212 and is configured to filter the DC power of the DC bus 212. The inverter stage 240 is connected to the DC bus 212 and is configured to convert the DC power to three-phase AC power for the output 213 to the electric motor (140).

The capacitor-based storage 250 has a DC capacitor bank 260 having one or more DC capacitors 262, which can be connected to the DC bus 212. During operation, the capacitor bank 260 of DC capacitors 262 can store regenerative power passed from the electric motor (140) back through the inverter stage 240 to the DC bus 212. In turn, the DC capacitor bank 260 can supply the stored DC power to the DC bus 212 for conversion to the three-phase AC power to drive the electric motor (140).

The control circuitry 270 is configured to pre-charge the one or more DC capacitors 262 of the DC capacitor bank 260 from the AC power of the AC power source (S). For example, the control circuitry 270 has a pre-charging circuit 290 connected between the input 211 and the capacitor bank 260 of DC capacitors 262. The control circuitry 270 is further configured to monitor one or more parameters of the variable frequency drive 210 and is configured to detect one or more fault conditions associated with the one or more monitored parameters.

Looking in more detail, the rectifier stage 220 has input receivers (i.e., diodes 122) that convert the incoming three-phase AC power from the source (S) to DC power on the DC bus 212. The rectifier stage 220 allows energy to flow into the inverter stage 240, but not back to the utility power source (S). The rectifier stage 220 is configured to receive 1-phase electrical power at the input 211 along three respective lines (also referred to herein as line voltage) from any suitable power source (S), which can be provided as an electrical power grid. The input line voltage can be a typical 480 volt (V) three phase input, such as when the power source (S) is defined by the electrical power grid.

In the present example, the rectifier stage 220 includes a plurality of diodes 122 arranged as pairs of diodes connected in parallel with each other between the positive and negative lines of the DC bus 212. The diodes 122 of each pair of diodes are connected in series with each other between the positive and negative lines of the DC bus 212. The diodes 122 of each pair of diodes are forward biased in the same direction from the positive line to the negative line. Here, to do the AC to DC conversion, the rectifier stage 220 includes three pairs of diodes 122 with each of the pairs connected in parallel. The diodes 122 of each of the pairs are forward biased in the same direction. Each of the pairs is connected to a respective one of the phases of the 1-phase input. In this way, the diodes 122 are arranged as a diode bridge that rectifies the voltage received from the AC power source (S) and outputs a single-phase DC bus voltage to the DC bus 212.

The DC bus filter 230 smooths the DC power on the DC bus 212. The DC bus filter 230 can use an inductor, a capacitor, or a combination of these to smooth out the rectified DC power. As a capacitor, the DC bus filter 230 can have a capacitance related to a peak current to be supplied to the electric motor (140) of the load. In one example, the capacitance can be in a range from approximately 10,000 microfarads (mfd) to approximately 10,000 mfd.

The inverter stage 240 converts the DC power into a variable frequency AC voltage that controls the speed of the electric motor (140). As shown, the inverter stage 240 can include a plurality of inverters 242 arranged as pairs connected in parallel with each other. The inverters 242 of each pair are connected in series with each other. Each of the pairs of inverters 242 is electrically connected along a separate line for the output 213 to the electric motor (140). The inverters 242 of the inverter stage 240 can use pulse width modulation (PWM) to actively switch the DC bus voltage to the electric motor (140) on-and-off. This produces an AC current to the electric motor (140).

As noted, overhauling or decelerating loads on the electric motor (140) can make the electric motor (140) turn faster than the synchronous speed set by the variable frequency drive 210. When this happens, the electric motor (140) acts as a generator in which mechanical energy from the electric motor (140) is converted into regenerative power. This regenerative power flows back into the variable frequency drive 210. Current is able to flow back across the inverters 242 of the inverter stage 240 to the DC bus 212, but the current is stopped from passing back to the source (S) by the rectifier stage 220. This increases the voltage level of the DC bus 212. To prevent overvoltage of the DC bus 212 and in contrast to prior art techniques that uses a dynamic braking resistor, the regenerative power is handled with the control apparatus 200 without using a dynamic braking resistor (or by only using a dynamic braking resistor in a limited way) to dissipate the regenerative power as heat.

In particular, the electric motor (140) draws/consumes the power from the utility power source (S) during one stroke section (e.g., the up-stroke operation) of the reciprocating pump unit, but the electric motor (140) generates regenerative power during another stroke section (e.g., the down-stroke operation) of the reciprocating pump unit. As noted previously, the use of a dynamic braking resistor is a common way to burn off the regenerative power to prevent a fault condition. However, this integrated control apparatus 200 eliminates the need to have a dynamic braking resistor to manage the regenerative power produced during the operation of the reciprocating pump unit. Instead, the integrated control apparatus 200 of FIG. 3 includes the capacitor-based storage 250, which is directly associated with the variable frequency drive 210.

As briefly noted above, the capacitor-based storage 250 includes the capacitor bank 260 having one or more DC capacitors 262. The capacitor-based storage 250 also includes the control circuitry 270, which has a controller 280 and a pre-charging circuit 290. The controller 280 can be a programmable logic controller (PLC) or another type of control unit. In general, the controller 280 can be defined by one or more components, including a processing unit 282, a memory 284, and sensors 286. The processing unit 282 of the controller 280 can use any suitable processor and can operate using program instructions stored in the memory 284, which can be volatile or non-volatile memory. The sensors 286 can include circuitry configured to measure a voltage level, a current level, and a temperature level associated with the variable frequency drive 210. This controller 280 can be independent of any other pump controller of the reciprocating pump unit (not shown), or this controller 280 can be part of (or its functions can be integrated into) any other pump controller of the reciprocating pump unit.

As an example, the storage's DC capacitors 262 can use nickel oxide hydroxide high amperage capacitors, although any other type of capacitor can be used. The DC capacitors 262 are connected across a DC bus 252 of the capacitor bank 260, which is connected to the DC bus 212 of the variable frequency drive 210.

As shown, the positive line of the DC bus 252 for the DC capacitors 262 can connect to the positive line of the DC bus 212 using an operating contact 258 and a fuse, and the positive line of the DC bus 252 for the DC capacitors 262 can connect to the negative line of the DC bus 212 using a fuse. The operating contact 258 can be a contactor, switch, relay, or the like, which can be controlled by the controller 280. The operating contact 258 is configured to selectively connect between (a) an opened state in which the DC capacitor bank 260 is electrically disconnected from the DC bus 212, and (b) a closed state in which the DC capacitor bank 260 is electrically connected to the DC bus 212.

The controller 280 controls pre-charging of the DC capacitors 262; checks initial voltage levels on the storage's DC bus 252 to start operations; and monitors voltage, current, temperature, and the like of the variable frequency drive 210 to detect possible fault conditions.

The pre-charging circuit 290 is controlled by the controller 280 and can selectively connect the energy storage's DC capacitors 262 to the three-phase input AC power of the variable frequency drive 210 provided by the power source (S). As shown, the pre-charging circuit 290 can be electrically connected by lines 256 to the input 211 of the variable frequency drive 210 to obtain AC power from the AC power source (S). This can simplify the hookup and connection of the variable frequency drive 210 to the power grid and can simply the variable frequency drive's enclosure and other features. However, the pre-charging circuit 290 can have its own hookup and connection to the power grid.

Either way, charging contacts 254 can be used on the lines 256 connected to the three-phase input AC power of the power source (S). Again, in this example, the lines 256 can connect to the input 211 of the variable frequency drive 210, but they could connect to a separate power grid hookup. The charging contacts 254 can be contactors, switches, relays, or the like, which can be controlled by the controller 280. The charging contacts 254 are configured to selectively connect between (a) an opened state in which the pre-charging circuit 290 is electrically disconnected from the input 211, and (b) a closed state in which the pre-charging circuit 290 is electrically connected to the input 211.

For pre-charging, the charging contacts 254 are selectively closed, and the operating contact 258 is selectively opened. The controller 280 can be configured to control the charging contacts 254 and the operating contact 258 to switch the capacitor-based storage 250 between a pre-charging mode and an operating mode.

In the pre-charging mode, the pre-charging circuit 290 converts the three-phase input AC power to DC power to charge the DC capacitors 262. For example, the pre-charging circuit 290 can include an AC-to-DC converter configured as a plurality of diodes 192 arranged in diode bridges connected in parallel with each other between the positive and negative lines of the storage's DC bus 252. Each of the diode bridges receives a voltage input from a respective one of the phases of input line voltage from lines 256. Thus, the converter of the pre-charging circuit 290 is configured to receive a 1-phase electrical input line voltage from the input 211, to rectify the AC line voltage, and to output a single-phase DC bus voltage to the storage's DC bus 252.

The DC capacitors 262 on the storage's DC bus 252 are connected in parallel with the pre-charging circuit 290 between the positive and negative lines of the storage's DC bus 252. In this way, the DC capacitors 262 are configured to receive and store the single-phase DC bus voltage output during pre-charging from the pre-charging circuit 290.

The DC capacitors 262 of the DC capacitor bank 260 can have a suitable capacitance. In general, the capacitance of the DC capacitors 262 is designed to receive, store, and deliver sufficient regenerative energy with the variable frequency drive 210. In one example, the DC capacitors 262 can include one or more supercapacitors with a capacitance in a range from approximately 1 Farad (F) to approximately 50 F.

After the energy storage's DC capacitors 262 have reached a target voltage level measured by the voltage (V) sensor 286V, the pre-charging circuit 290 discontinues the pre-charging. The controller 280 selectively opens the charging contacts 254 and closes the operating contact 258 to enter operating mode. In the operating mode, the cathode of the capacitor-based storage 250 is electrically connected to the positive side of the drive's inverters 242 through the closed operating contact 258. The voltages on the drive's DC bus 212 and the storage's DC bus 252 are connected during normal operation so power can be conducted between the drive's DC bus 212 and the storage's DC bus 252.

During operation, the electric motor (140) draws/consumes the power from the utility power source (S) and from the associated capacitor-based storage 250 during the up-stroke operation of the reciprocating load (e.g., reciprocating pump unit). As the electric motor (140) generates regenerative power during the down-stroke operation of the reciprocating pump unit, the one or more DC capacitors 262 of the associated capacitor-based storage 250 store the regenerative power for later use. The control circuitry 270 (e.g., the controller 280) can manage the power flow if necessary. However, the arrangement of the circuitry for the capacitor-based storage 250 and the variable frequency drive 210 inherently allows for the energy to flow as needed so that the control circuitry 270 does not need to directly manage the power flow.

The capacitor bank 260 having the DC capacitors 262 enhances the performance of the reciprocating pump unit by increasing the operating efficiency of the variable frequency drive 210 and by eliminating the need for having the dynamic braking resistor on the variable frequency drive 210. The reliability of the variable frequency drive 210 increases significantly due to the elimination of the dynamic braking resistor. The operating efficiency of the variable frequency drive 210 also increases due to the reuse of the regenerative energy.

As noted above, the controller 280 can be configured to monitor one or more parameters of the variable frequency drive 210 and can be configured to detect one or more fault conditions associated with the one or more monitored parameters. For example, the controller 280 can include a voltage (V) sensor 286V having circuitry configured measure a voltage level associated with the storage's DC bus 252. Therefore, in the operating mode, the voltage (V) sensor 286V can measure the voltage level of the drive's DC bus 212 (connected to the storage's DC bus 252). The controller 280 can then detect a voltage fault based on the measured voltage level as one of the one or more fault conditions. In the pre-charging mode, the voltage (V) sensor 286V can measure the voltage level measured of the storage's DC bus 252 (disconnected from the drive's DC bus 212). The controller 280 can then detect pre-charging of the DC capacitor bank 260 to a predefined voltage threshold.

In another example, the controller 280 can include a current (I) sensor 286I having circuitry configured measure a current level associated with the storage's DC bus 252. Therefore, in the operating mode, the current (I) sensor 286I can measure a current level of the drive's DC bus 212 (connected to the storage's DC bus 252), and the controller 280 can detect a current fault based on the measured current level. The current (I) sensor 286I can also measure a current level of the capacitor-based storage 250 during the pre-charging mode.

In yet another example, the controller 280 can include a temperature (T) sensor 286T having circuitry configured to measure a temperature level associated with the DC capacitor bank 260. Therefore, in the operating mode, the temperature (T) sensor 286T can measure the temperature level of the DC capacitor bank 260, and the controller 280 can detect a temperature fault based on the measured temperature level. Temperature levels can be measured with respect to other parts of the variable frequency drive 210 as well. Moreover, temperature levels can be measured during the pre-charging mode.

Some additional details related to the control apparatus 200 of FIG. 3 are disclosed in co-pending with U.S. Non-Provisional application Ser. No. 18/522,707 filed Nov. 29, 2021, which claims the benefit of U.S. Provisional Appl. No. 61/601,747 filed Nov. 29, 2021, both of which are incorporated herein by reference in their entireties.

FIG. 4 is a flowchart of a process 300 used with a control apparatus of the present disclosure having a variable frequency drive and capacitor-based storage. Reference to elements in FIG. 3 are provided for better understanding. As noted, the variable frequency drive 210 is connected to an alternating (AC) power source S and is configured to drive an electric motor 140. In some implementations, one or more process blocks of FIG. 4 may be performed by the variable frequency drive 210, the capacitor-based storage 250, the control circuitry (270), and other elements shown in FIG. 3.

As shown in FIG. 4, the process 300 starts in a pre-charging mode by pre-charging the one or more DC capacitors 262 of the variable frequency drive 210 (Block 302). For example, the pre-charging circuit 290 may pre-charge the one or more DC capacitors 262. To do this, the controller 280 of the control circuitry 270 disconnects the DC capacitors 262 from the DC bus 212 of the variable frequency drive 210 by opening (or keeping open) the operating contact 258. The controller 280 also connects the pre-charging circuit 290 to the AC power source (S) by closing the charging contacts 254. The pre-charging circuit 290 converts AC power from the AC power source (S) to the DC power at a target voltage level for the DC capacitors 262. The voltage (V) sensor 286V of the controller 280 can monitor the voltage levels. After pre-charging to the target voltage level, the controller 280 then disconnects the pre-charging circuit 290 from the AC power source (S) by opening the charging contacts 254 and sets up the variable frequency drive 210 for operation by closing the operating contact 258 and connecting the DC capacitors 262 to the DC bus 212.

After pre-charging, the DC capacitors 262, the process 300 can switch to an operating mode to drive the electric motor (Block 404). The rectifier stage 220 of the variable frequency drive 210 converts the AC power from the AC power source (S) to DC power for the DC bus 212 (Block 306). The inverter stage 240 converts the DC power on the DC bus 212 drawn from the rectifier stage 220 and from the DC capacitors 262 to three-phase AC power for output to the electric motor (140) (Block 308). Thus, the electric motor (140) consumes/draws the power at the inverter stage 240 available from the DC bus 212, which comes from the rectifier stage 220 and/or the capacitor-based storage 250, as the case may be.

When the electric motor (140) acts as a generator during operation, the process 300 then stores, in the DC capacitors 262, regenerative power passed from the electric motor (140) back through the inverter stage 240 to the DC bus 212 (Block 310). For example, the regenerative power on the DC bus 212 passed from the inverter stage 240 is stored on the DC capacitors 262 as stored DC power. Then, based on operational needs, the stored DC power on the DC capacitors 262 can be supplied to the DC bus 212 for conversion by the inverter stage 240 to the three-phase AC power to drive the electric motor (140).

Finally, in the process 300, the control circuitry 270 can monitor one or more parameters of the variable frequency drive 210 and can detect one or more fault conditions associated with the one or more parameters (Block 312). As noted, the parameters to be monitored can be voltage level, current level, and temperature level. Other parameters can be monitored as needed. The monitoring of the parameters can be performed during one or both of the pre-charging mode and the operating mode.

Although FIG. 4 shows example blocks of the process 300, in some implementations, the process 300 may include additional blocks, fewer blocks, different blocks, or differently arranged blocks than those depicted in FIG. 4. Additionally, or alternatively, two or more of the blocks of the process 300 may be performed in parallel.

Figure 5:
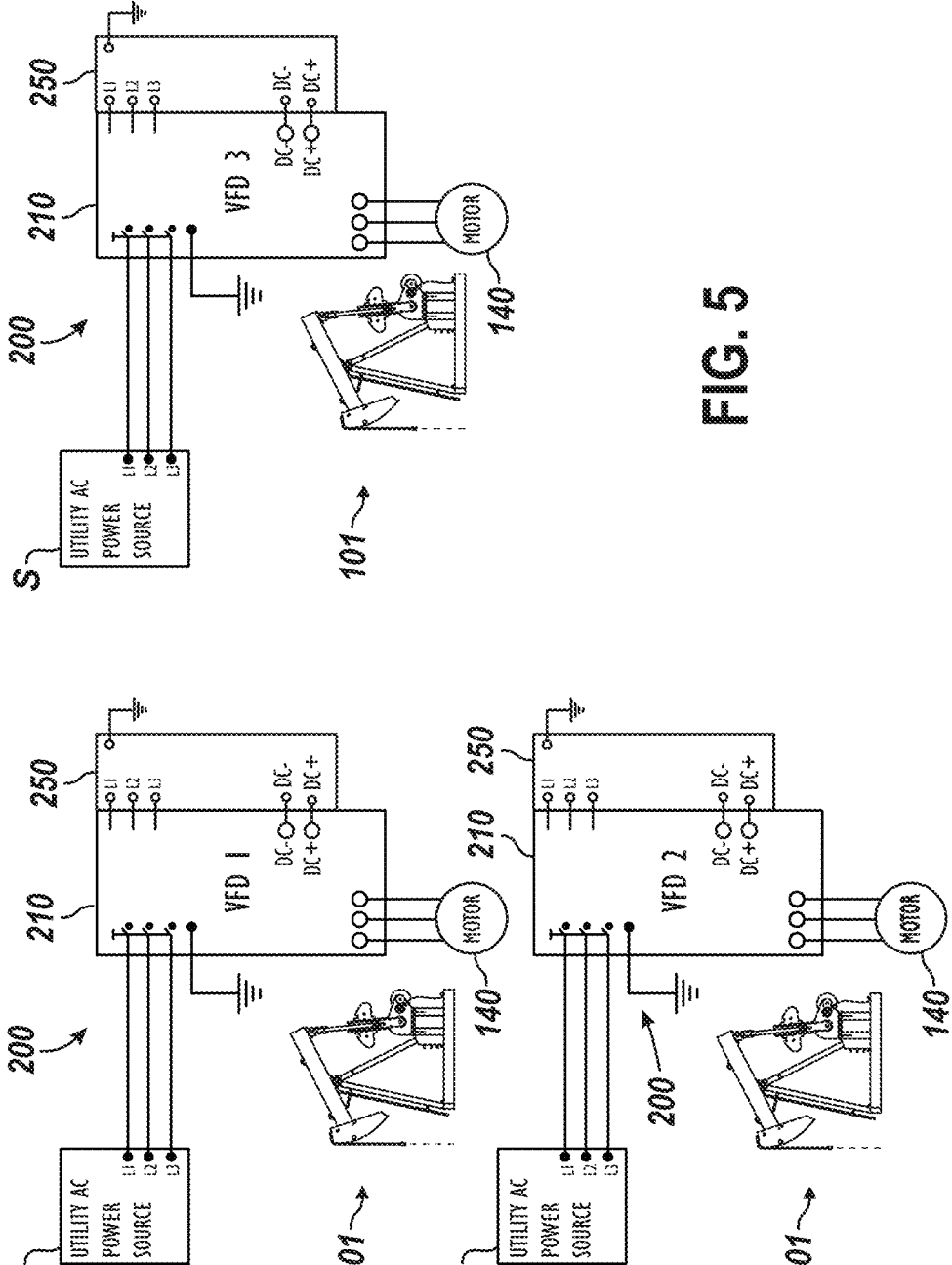
FIG. 5 illustrates an installation of reciprocating load devices, each having a control apparatus according to the present disclosure.

FIG. 5 illustrates an installation of reciprocating load devices (e.g., reciprocating pumping units 101 shown here as beam-type pump jack units) each having an integrated control apparatus 200 (e.g., control circuitry) according to the present disclosure. Three reciprocating pumping units 101 are shown, each having a variable frequency drive 210 for an electric motor 140. The variable frequency drives 210 connect to the utility AC power source (S) and power the connected electric motor 140.

Each of the variable frequency drives 210 lacks a dynamic braking resistor, although one could be used. Instead, the DC terminals for each variable frequency drive 210 connect to the DC terminals of an associated capacitor-based storage 250. Accordingly, each of the variable frequency drives 210 has its own associated capacitor-based storage 250 and does not share regenerative power with the variable frequency drives 210 of other surface pumping units 101. Consequently, a fault of one variable frequency drive 210 does not affect the variable frequency drives 210.

The associated capacitor-based storage 250 can be integrated within the same enclosure of the variable frequency drive 210 or can be integrated as an add-on enclosure bolted on the side of the variable frequency drive 210 to manage the regenerative energy created during the downstroke operation of the reciprocating pump unit. In either case, the capacitor-based storage 250 also connects to the utility AC power source of the variable frequency drive 210. In one example, the associated capacitor-based storage 250 can be designed for a 1-phase 480V/60 Hz environment and can be used with diode front-end 6-pulse variable frequency drives offering 65HP to 150HP.

Programming of the controller (280) of the capacitor-based storage 250 can be accessible from outside the variable frequency drive 210 and the enclosure. The controller (280) can be MODBUS enabled for automation. In general, the associated capacitor-based storage 250 is self-contained, and no user interface is required.

Figure 6:
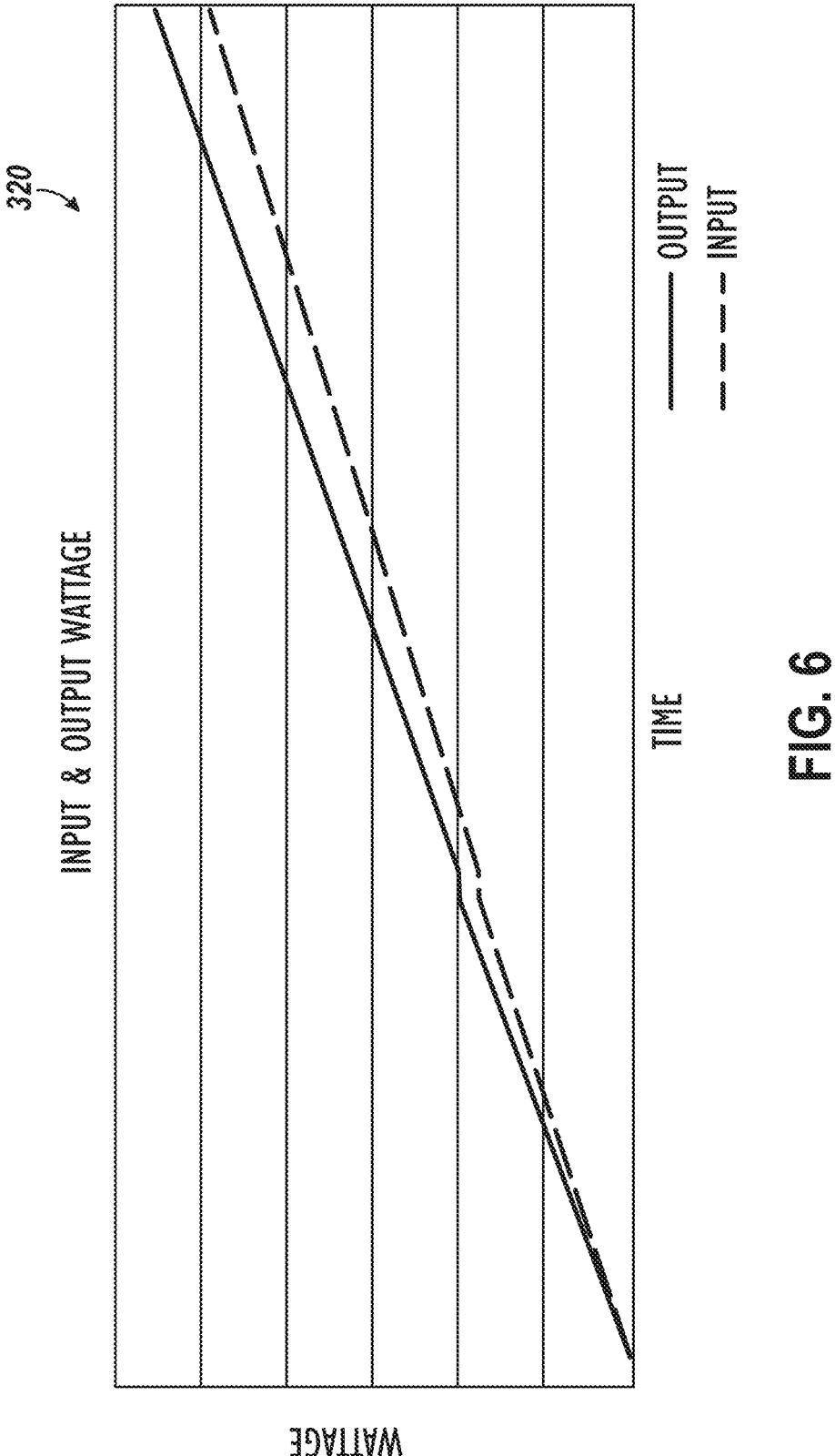
FIG. 6 illustrates a graph that evaluates performance of a control apparatus of the present disclosure when used on reciprocating pumping units having variable frequency drives with associated capacitor-based storage and lacking a dynamic braking resistor and a chopper circuit.

FIG. 6 illustrates a graph 320 that evaluates performance of a control apparatus (200) of the present disclosure when used on reciprocating pump units (101) having variable frequency drives (210) with associated capacitor-based storage (250) and lacking a dynamic braking resistor and a chopper circuit. Input and output wattages are shown for an installation having multiple reciprocating pumping units (101) operated using electric motors (140). Each electric motor (140) of the reciprocating pumping units (101) is operated by one of the disclosed integrated control apparatuses (200).

The input wattage measured for the installation is shown increasing linearly over time during operation. The variable frequency drives (210) may have an internal loss associated with their efficiency, such as an internal loss of 2%. Even with this internal loss, the output wattage produced for the installation shows an increased trend over the input wattage. Therefore, the integrated control apparatus (200) of the present disclosure can increase the efficiency by producing more output wattage per unit of input wattage by recycling the regenerative energy of the associated variable frequency drive (210). It is believed that in some installations, the efficiency can provide about 16% in wattage saving assuming the variable frequency drives have an internal loss of 2%. In the end, the energy efficiency of the integrated control apparatus (200) reduces the operating costs and reduces the environmental impact of the installation.

Figure 7A:
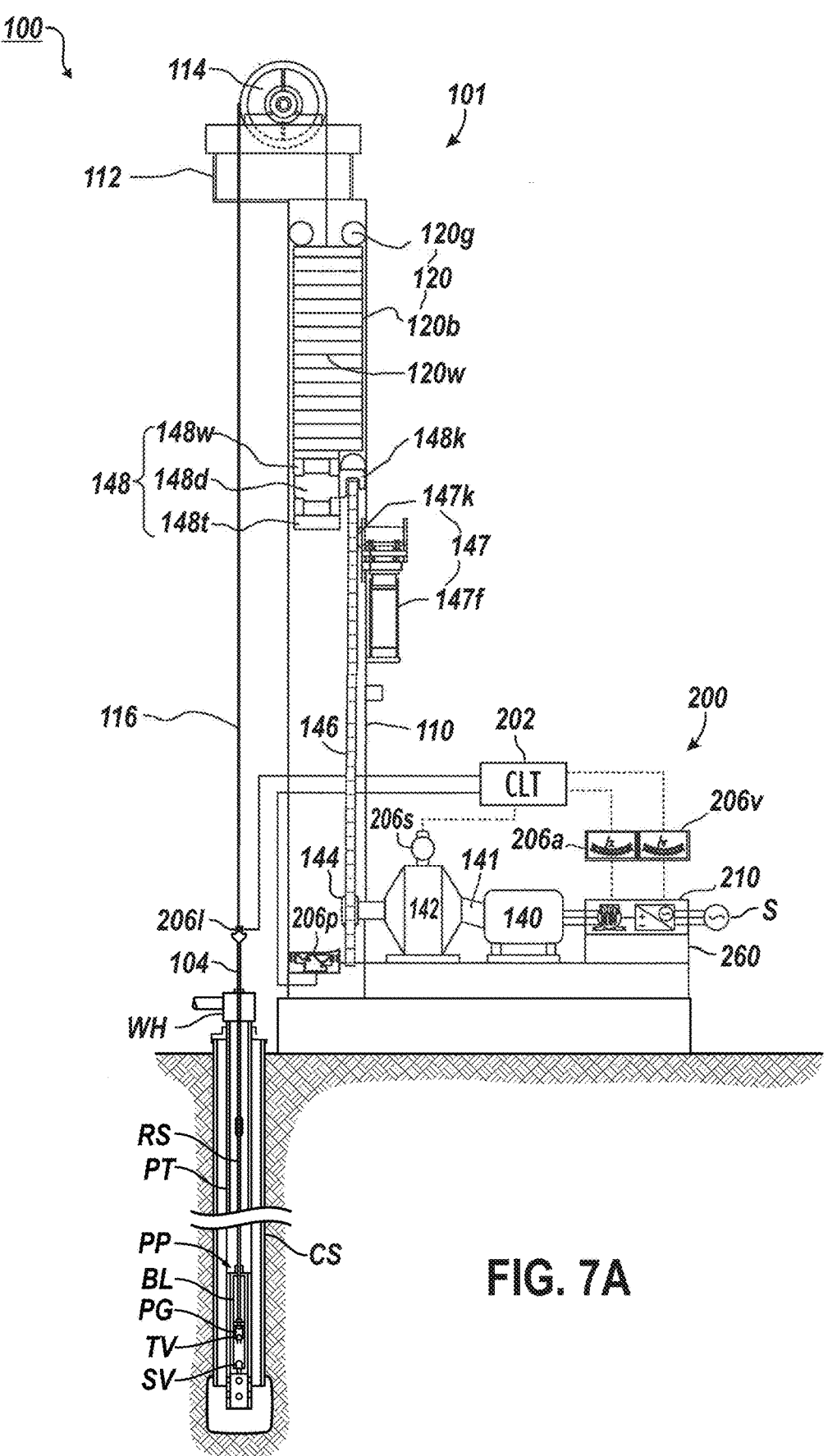
FIG. 7A illustrates a reciprocating pump system having an example of a long stroke pumping unit and a control apparatus according to the present disclosure.
Figure 7B:
FIG. 7B illustrates a reciprocating pump system having another example of a long stroke pumping unit and a control apparatus according to the present disclosure.

Turning now to another example of the present disclosure, FIGS. 7A and 7B illustrate reciprocating pump systems 100, each having a surface pumping unit 101 and a control apparatus 200 according to the present disclosure. In these examples, each of the surface pumping units 101 is a long stroke pumping unit, which is part of the reciprocating pump systems 100 having a rod string RS and a downhole pump PP. Each of the reciprocating pump systems 100 is operable to pump production fluid from a hydrocarbon bearing formation intersected by a well, which includes a wellhead WH located above a wellbore. The wellbore extends from the surface to a hydrocarbon-bearing formation.

A casing string CS extends from the wellhead WH into the wellbore and is sealed in the wellbore with cement (not shown). A production string PS extends from the wellhead WH and into the wellbore. The production string PS has the downhole pump PP connected at a bottom of the production string PS.

The downhole pump PP includes a tubular barrel BL with a standing valve SV that allows production fluid to enter from the wellbore and does not allow the fluid to leave. A close-fitting hollow plunger PG is located inside the pump barrel BL. The plunger PG has a traveling valve TV that allows fluid to move from below the plunger PG to the production string PS above and does not allow fluid to return from the production string PS to the pump barrel BL below the plunger PG. The plunger PG is connected to the rod string RS for reciprocation thereby.

During the upstroke of the plunger PG, the traveling valve TV closes, and any fluid above the plunger PG in the production string PS is lifted towards the surface. Meanwhile, the standing valve SV opens and allows fluid to enter the pump barrel BL from the wellbore. During the downstroke of the plunger PG, the traveling valve TV opens, and the standing valve SV closes to transfer the fluid from the pump barrel BL to the plunger PG.

The rod string RS extends from the long stroke pumping unit 101, through the wellhead WH, and into the wellbore. The rod string RS may include a jointed or continuous sucker rod string RS. A polished rod 104 is connected to an upper end of the sucker rod string RS, and the pump plunger PG is connected to a lower end of the sucker rod string RS, such as by threaded couplings.

A production tree (not shown) may be connected to an upper end of the wellhead WH, and a stuffing box (not shown) may be connected to an upper end of the production tree, such as by flanged connections. The polished rod 104 may extend through the stuffing box. A seal assembly of the stuffing box seals against an outer surface of the polished rod 104 and accommodates reciprocation of the polished rod 104 relative to the stuffing box.

In general, each of the long stroke pumping units 101 in FIGS. 7A-7B includes an electric motor 140, a gearbox or reducer 142 driven by the electric motor 140, a link of the reducer 142 to a counterweight 120, and a belt 116 connecting the counterweight 120 to the rod string RS. Like the beam-type pump jack unit of FIG. 2, the long stroke pumping unit 101 is gear driven and experiences inertia in response to any changes from its current motion. Therefore, jarring (and resultant breaking/stretching) of the rod string RS may result during changes in the stroke cycles of the reciprocating pumping unit 101 during its operation. To counteract such jarring, the long stroke pumping unit 101 may be controlled to decrease the speed of the rod string RS for changes in the stroke cycles of the unit 101. As expected, decreasing the speed reduces the efficiency of the fluid pumping, thus increasing the cost of the well.

The reciprocating motion of the long stroke pumping unit 101 creates variable torque requirements from the gearbox or reducer 142, which in turn means variable power consumption from the electric motor 140 and the AC power grid(S). Also, there is an inherent imbalance between the upstroke power consumption and the downstroke power consumption in the reciprocating rod lift application. This results in the electric motor 140 going into power generation mode during parts of the stroke cycles. As noted in the Background of the present disclosure, this excess energy may normally be sent to a dynamic braking resistor, which expends the excess energy as heat.

Looking at FIG. 7A in more detail, the long stroke pumping unit 101 includes a tower 110, a crown 112, a belt driver 114, a load belt 116, a counterweight 120, an electric motor 140, a rotary linkage 141, a gearbox or reducer 142, a drive sprocket 144, a chain 146, a chain idler 147, and a carriage 148.

The control apparatus 200 can include the components as shown in FIG. 3, which are incorporated here. As generally shown in FIG. 7A, the control apparatus 200 includes control circuitry 202, a variable frequency drive 210, and a capacitor bank 260. The control circuitry 202 may include a programmable logic controller (PLC), an application-specific integrated circuit (ASIC), a field-programmable gate array (FPGA), or another type of computerized control device. As disclosed herein, components of the control apparatus 200, such as the control circuitry 202, the variable frequency drive 210, and the capacitor bank 260, can be integrated together and combined into one physical control unit or apparatus. Alternatively, one or more these components can be separate elements operably connected to other elements.

The control apparatus 200 also includes a position sensor 206p, a load sensor 206l, and a speed sensor or tachometer 206s. The control apparatus 200 may also include a voltmeter 206v and an ammeter 206a. These and other sensor arrangements can be used.

The electric motor 140 can be an induction motor, a switched reluctance motor, a permanent magnet motor, a brushless direct current motor, or other type of electric device to provide rotational drive.

The variable frequency drive 210 is in electrical communication with the electric motor 140. The variable frequency drive 210, which acts as a variable speed driver, includes a rectifier and an inverter. The variable frequency drive 210 receives a three-phase alternating current (AC) power signal from a three-phase power source (S), such as a generator or transmission lines. The rectifier converts the three phase AC power signal to a direct current (DC) power signal, and the inverter modulates the DC power signal to drive each phase of the electric motor 140 based on speed instructions from the control apparatus 200. The voltmeter 206v and ammeter 206a may be connected to the variable frequency drive 210 or between the variable frequency drive 210 and the three-phase power source (S) for measuring electrical power consumed by the variable frequency drive 210 from the three-phase power source (S).

As described herein, electric power generated by the electric motor 140 on particular sections of the unit's stroke cycles is converted to usable power for storage by the capacitor bank 260. In turn, the capacitor bank 260 may then return stored power to the variable frequency drive 210 on other sections of the unit's stroke cycles, thereby lessening the demand on the three-phase power source (S).

For this long stroke pumping unit 101, the rotary linkage 141 connects a rotor of the electric motor 140 to an input shaft of the reducer 142. The rotary linkage 141 can include a sheave connected to the rotor, a sheave connected to the input shaft, and a V-belt connecting the sheaves. The reducer 142 can be a gearbox including the input shaft, an input gear connected to the input shaft, an output gear meshed with the input gear, and an output shaft connected to the output gear mounted in a gear case. The output gear may have an outer diameter substantially greater than an outer diameter of the input gear to achieve reduction of angular speed of the electric motor 140 and amplification of torque thereof. The drive sprocket 144 is connected to the output shaft of the reducer 142. The speed sensor or tachometer 206s, which can be mounted on the reducer 142, monitors an angular speed of the output shaft and reports the angular speed to the control apparatus 200 via a data link.

The chain 146 is meshed with the drive sprocket 144 and extends to the idler 147. The chain 146 orbits around chain idler 147 and the drive sprocket 144. The idler 147 includes an idler sprocket 147k meshed with the chain 146, and an adjustable frame 147f mounts the idler sprocket 147k to the tower 110 while allowing for rotation of the idler sprocket 147k relative thereto. The adjustable frame 147f may vary a height of the idler sprocket 147k relative to the drive sprocket 144 for tensioning the chain 146.

The carriage 148 longitudinally connects the counterweight 120 to the chain 146 while allowing relative transverse movement of the chain 146 relative to the counterweight 120. The carriage 148 may include a block base 148b, one or more wheels 148w, a track 148t, and a swivel knuckle 148k. The track 148t may be connected to a bottom of the counterweight assembly 120, such as by fastening. The wheels 148w may be engaged with upper and lower rails of the track 148t, thereby longitudinally connecting the block base 148b to the track while allowing transverse movement therebetween. The swivel knuckle 148k may include a follower portion assembled as part of the chain 146 using fasteners to connect the follower portion to adjacent links of the chain 146. The swivel knuckle 148k may have a shaft portion extending from the follower portion and received by a socket of the block base 148b and connected thereto by bearings (not shown) such that swivel knuckle 148k may rotate relative to the block base 148b.

The counterweight 120 is disposed on the tower 110 and is longitudinally movable relative thereto. The counterweight assembly 120 may include a counterweight box 120b, one or more counterweights 120w disposed in the box, and guide wheels 120g. The guide wheels 120g may be connected at each corner of the counterweight box 120b for engagement with respective guide rails of the tower 110, thereby transversely connecting the box to the tower 110. The counterweight box 120b may be loaded with counterweights 120w until a total balancing weight of the counterweight assembly 120 corresponds to the weight of the rod string RS and/or the weight of the column of production fluid.

The crown 112 may be a frame mounted atop the tower 110. The belt driver (e.g., drum assembly) 114 may include a drum, a shaft, one or more pillow blocks mounted to the crown 112, and one or more bearings for supporting the shaft from the pillow blocks while accommodating rotation of the shaft relative to the pillow blocks.

The load belt 116 has a first end longitudinally connected to a top of the counterweight box 120b, such as by a hinge, and the load belt 116 has a second end linked to a hanger bar (not shown), such as by one or more wire ropes. The load belt 116 extends from the counterweight assembly 120 upward to the drum assembly 114, over an outer surface of the drum, and downward to the polished rod 104.

In other alternatives, the counterweight's position may be determined by the variable frequency drive 210 having the voltmeter and/or ammeter in communication with each phase of the electric motor 140. Should the electric motor 140 be a switched reluctance motor or a permanent magnet motor, the variable frequency drive 210 may drive only two of the stator phases at any given time, and the voltmeter and/or ammeter can be used measure back electromotive force (EMF) in the idle phase. The variable frequency drive 210 may then use the measured back EMF from the idle phase to determine the position of the counterweight assembly 120.

Another example of the long stroke pumping unit 101 illustrated in FIG. 7B is similar to that discussed above with reference to FIG. 7A. Therefore, the same reference numerals are used for similar components. As before, the long stroke pumping unit 101 may be part of a reciprocating pumping system 100 further including a rod string RS and a downhole pump PP. In this example, the long stroke pumping unit 101 includes a tower 110, a crown 112, a belt driver 114, a load belt 116, a counterweight assembly 120, an electric motor 140, a gearbox or reducer 142, and a control apparatus 200 (e.g., control circuitry).

As before, the control apparatus 200 can include the components as shown in FIG. 3, which are incorporated here. As generally shown in FIG. 7B, the control apparatus 200 includes control circuitry 202, a variable frequency drive 210, and a capacitor bank 260. Again, the control circuitry 202 may include a programmable logic controller (PLC), an application-specific integrated circuit, (ASIC), a field-programmable gate array (FPGA), or the like. The control apparatus 200 also includes a position sensor 206p (e.g., a laser rangefinder), a load sensor 206l, and a speed sensor 206s.

As described herein, electric power generated by the electric motor 140 on particular sections of the unit's stroke cycles is converted to usable power for storage by the capacitor bank 260. In turn, the capacitor bank 260 may then return stored power to the variable frequency drive 210 on other sections of the unit's stroke cycles, thereby lessening the demand on the three-phase power source (S).

For this long stroke pumping unit 101, the counterweight assembly 120 is disposed in the tower 110 and is longitudinally movable relative thereto. The counterweight assembly 120 may include a box, one or more counterweights disposed in the box, and guide wheels. The counterweight assembly 120 may further include a mirror 120m mounted to a bottom of the counterweight assembly 120 and in a line of sight of the laser rangefinder 206p.

The crown 112 may be a frame mounted atop the tower 110. The belt driver 114 may include a shaft, a drum, one or more sprockets, one or more (pillow blocks mounted to the crown 112, and one or more (pair shown) bearings for supporting the shaft from the pillow blocks while accommodating rotation of the shaft relative to the pillow blocks. The electric motor 140 may have one or more, such as three, phases and may be an induction motor, a switched reluctance motor, or a permanent magnet motor, such as a brushless direct current motor.

The load belt 116 has a first end longitudinally connected to a top of the counterweight assembly 120, such as by a hinge, and the load belt 116 has a second end longitudinally connected to a hanger bar (not shown), such as by wire rope. The load belt 116 extends from the counterweight assembly 120 upward to the belt driver 114, over outer surfaces of the drum and sprockets, and downward to the hanger bar, which is connected to the polished rod 104, such as by a rod clamp. The load sensor 206l, which can be a load cell, may be disposed between the rod clamp and the hanger bar. The load sensor 206l can measure tension in the rod string RS and report the measurement to the control apparatus 200 via a data link.

The laser rangefinder 206p mounted in the base of the tower 110 is aimed at the mirror 120m. The laser rangefinder 206p is in power and data communication with the control apparatus 200, which can obtain the position measurements of the counterweight 120. The control apparatus 200 uses the measurements from the laser rangefinder 206p to determine velocity and position of the counterweight 120.

Alternatively, the laser rangefinder 206p may be mounted on the crown 112 and the mirror 120m may be mounted to the top of the counterweight 120. Alternatively, the position sensor 206p may be an ultrasonic rangefinder instead of the laser rangefinder. The ultrasonic rangefinder 206p may include a series of units spaced along the tower 110 at increments within the operating range thereof. Each unit may include an ultrasonic transceiver (or separate transmitter and receiver pair) and may detect proximity of the counterweight box 110b when in the operating range. Alternatively, the position sensor 206p may be a string potentiometer instead of the laser rangefinder. The potentiometer may include a wire connected to the counterweight 120, a spool having the wire coiled thereon and connected to the crown 112 or tower base, and a rotational sensor mounted to the spool and a torsion spring for maintaining tension in the wire. Alternatively, a linear variable differential transformer (LVDT) may be mounted to the counterweight 120, and a series of ferromagnetic targets may be disposed along the tower 111. These and other arrangements can be used for the position sensor 206p.

As shown in FIG. 7B, the variable frequency drive 210 is in electrical communication with the electric motor 140. The variable frequency drive 210, which acts as a variable speed driver, includes a rectifier and an inverter. The variable frequency drive 210 receives a three-phase alternating current (AC) power signal from a three-phase power source (S), such as a generator or transmission lines. The rectifier converts the three phase AC power signal to a direct current (DC) power signal, and the inverter modulates the DC power signal to drive each phase of the electric motor based on control signals from the control apparatus 200.

As described herein, electric power generated by the electric motor 140 on particular sections of the unit's stroke cycles is converted to usable power for storage by the capacitor bank 260. In turn, the capacitor bank 260 may then return stored power to the variable frequency drive 210 on other sections of the unit's stroke cycles, thereby lessening the demand on the three-phase power source (S).

Although shown with reference to these examples of long stroke pumping units 101 in FIG. 7A-7B, the control apparatus 200 as disclosed herein can be used with other sucker rod pumping units, such as other types of long stroke pumping units, pump-jack units, etc. In one alternative, for example, the control apparatus 200 may be used with a long stroke pumping unit having a linear electric motor including a stator mounted to the tower 110 and a traveler mounted to the counterweight box 120b. In yet another alternative, the control apparatus 200 may be used with a linear electric motor including a stator mounted to the wellhead WH and a traveler integrated with the polished rod 104. In this alternative, the control apparatus 200 may have a rod string position sensor instead of a counterweight position sensor, and the rod string position sensor may use either type of counterweight position sensors disclosed herein. Additional details of long stroke pumping units that can use a control apparatus and teachings as disclosed herein are provided in U.S. Pat. Nos. 10,113,544 and 10,400,761, which are incorporated herein by reference.

Figures 8, 9:
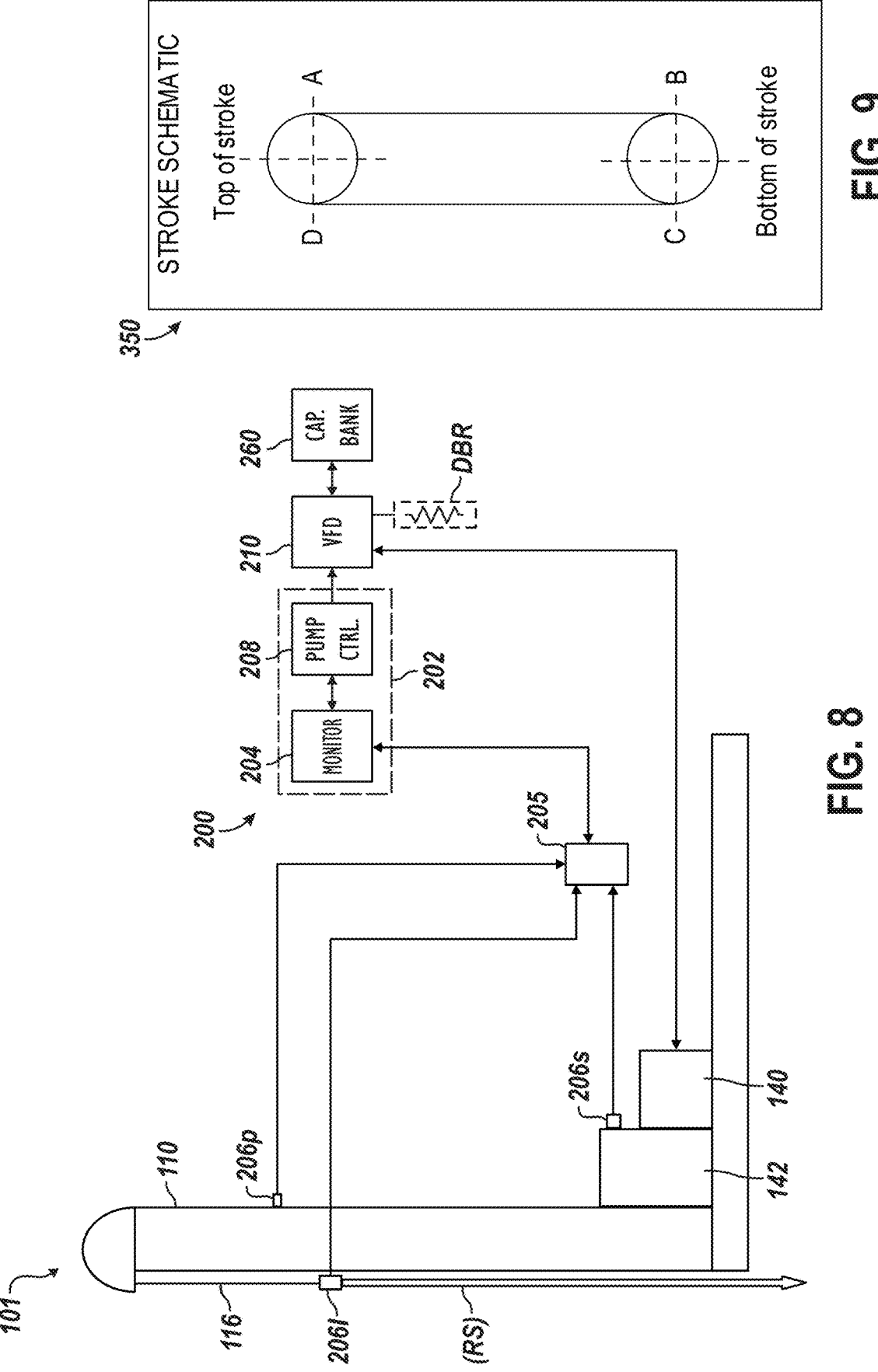
FIG. 8 schematically illustrates a long stroke pumping unit and a control apparatus of the present disclosure.
FIG. 9 schematically illustrates a stroke of a long stroke pumping unit of the present disclosure.

FIG. 8 schematically illustrates a reciprocating pumping unit 101 and a control apparatus 200 of the present disclosure. Here, the reciprocating pumping unit 101 is a long stroke pumping unit, and only some of the components of the unit 101 are shown here—i.e., a tower 110, a load belt 116, an electric motor 140 and a gearbox or reducer 142.

The control apparatus 200 includes control circuitry 202, sensors (206s, 206l, 206p), a variable frequency drive 210, and a capacitor bank 260. The control circuitry 202 can include a monitoring function or unit 204 and a pump controller function or unit 408. A junction box 205 can connect the control circuitry 202 to the sensors, which include a speed sensor 206s, a load sensor 206l, and a position sensor 206p.

The pump controller function 208 can be an existing component of the reciprocating pumping unit 101, and the other components of the control apparatus 200 can be operationally connected to the pump controller function 208. In other arrangements, the control apparatus 200 can include one or more of the components, including the pump controller function 208, integrated together.

The pump controller function 208 is directed to some of the conventional functions used during operation of the reciprocating pumping unit 101, such as determining load and position of the downhole pump PP, monitoring production rate, targeting certain operational setpoints, and the like. The variable frequency drive 210 and the capacitor bank 260 can correspond to the variable frequency drive and the capacitor bank as disclosed herein, such as with reference to FIG. 3.

The speed sensor 206s is configured to measure a speed related to the strokes of the reciprocating pumping unit 101 either directly or indirectly. For example, the speed sensor 206s can measure rotational speed of the gearbox 142, a motor shaft, a linkage, etc. In another example, the speed sensor 206s can measure the speed of a counterweight (not shown) as it moves along the tower 110. These and other measurements can be used. In turn, the measurement can then be correlated to speeds during the strokes of the reciprocating pumping unit 101.

The load sensor 206l is configured to measure the load between the load belt 116 and the rod string (RS). The measured load at surface can then be used to calculate downhole load at the downhole pump PP using conventional techniques.

The position sensor 206p is configured to measure one or more positions related to the strokes of the reciprocating pumping unit 101 either directly or indirectly. For example, the position sensor 206p can measure a position of the counterweight (not shown) on the tower 110 by measuring a distance of the sensor from a reference point. The one or more positions in the strokes can then be determined from the measurements. As will be appreciated, the surface measurements of position and load at surface can be correlated to various downhole conditions related to the downhole pump PP, as is known in the art. Any of the various forms of speed sensor, 206s, load sensor 206l, position sensor 206p disclosed herein or known in the art can be used by the control apparatus 200.

The monitoring function 204 obtains measurements from the sensors 206s, 206l, 206p for the operational parameters of the reciprocating pumping unit 101. The monitoring function 204 communicates with the pump controller function 208, which in turn controls the variable frequency drive 210 of the reciprocating pumping unit 101 to achieve operational objectives, such as production efficiency, strokes-per-minute, etc. As discussed, the variable frequency drive 210 drives the electric motor 140 to operate the reciprocating pumping unit 101. The capacitor bank 260 is connected to (or integrated into) the variable frequency drive 210 to store and supply (discharge) energy.

In general, the control apparatus 200 may or may not include a dynamic braking resistor (DBR) and a chopper circuitry (not shown). The control apparatus 200 reduces the need to expend excess energy to heat and reduces overall power consumption. To do this, the capacitor bank 260 includes an array of capacitors connected to (or integrated with) the variable frequency drive 210 operating the reciprocating pumping unit 101. In general, during the part of the stroke cycle where the electric motor 140 turns into power generation mode, excess energy is sent to the capacitor bank 260. On the next cycle of the stroke cycle, this energy stored in the capacitor bank 260 can then be provided to the electric motor 140 to supplement the total energy required. This reduces the overall power consumption of the long stroke pumping unit 101. The variable frequency drive 210 can more aggressively drive the electric motor 140 without overload, even when the control apparatus 200 lacks a dynamic braking resistor. When such a dynamic braking resistor is used, however, the variable frequency drive 210 can aggressively drive the electric motor 140 while relying less on the dynamic braking resistor to expel excess energy.

Briefly, FIG. 9 schematically illustrates a stroke cycle 350 (i.e., stroke) of the long stroke pumping unit of the present disclosure. The operational positions in the stroke cycle 350 include transitions or setpoints A, B, C, and D. Transition A occurs after the long stroke pumping unit has cornered the top of stroke (TOS) at a TOS cornering speed and starts its downstroke by accelerating toward a downstroke straightway speed. Transition B occurs before cornering at the bottom of stroke (BOS) as the stroke decelerates from the downstroke straightway speed toward the BOS cornering speed. Transition C occurs after the long stroke pumping unit has cornered the bottom of stroke (BOS) at the BOS cornering speed and starts its upstroke by accelerating toward an upstroke straightway speed. Transition D occurs before cornering at the top of stroke (TOS) as the stroke decelerates from the upstroke straightway speed toward the TOS cornering speed. The stroke cycle 350 then repeats. The speeds can vary from one stroke cycle 350 to the other over time and can depend on various measurements, such as current rod load, energy consumption, etc.

Depending on operational conditions, the TOS cornering speed can be the same as or different from the BOS cornering speed, and the downstroke straightway speed can be the same as or different from the upstroke straightway speed. Typically, each these speeds are different from one another.

The electrical energy consumed by the electric motor 140 depends on the counterbalance and other forces experienced during the strokes of the long stroke pumping unit 101. For example, variable torque requirements from the gearbox 142 can vary the power consumption of the electric motor 140. Also, an inherent imbalance between the upstroke power consumption and downstroke power consumption can vary the power consumption of the electric motor 140. This results in the electric motor 140 going into power generation mode during parts of the stroke cycle 350.

Figure 10:
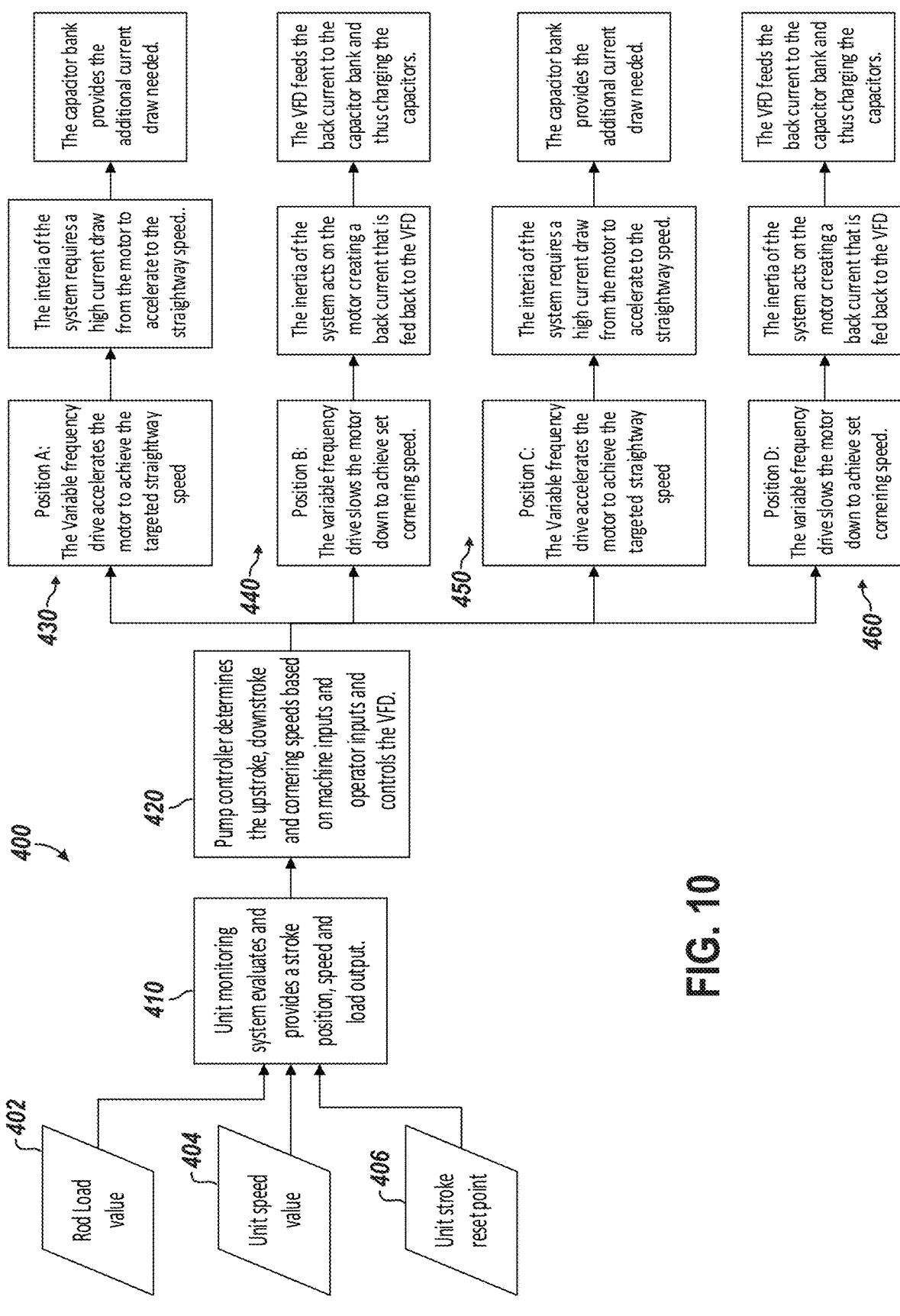
FIG. 10 illustrates a process to control a long stroke pumping unit in flow chart form according to the present disclosure.

Looking further at the operation of the long stroke pumping unit 101 and the control apparatus 200, FIG. 10 illustrates a process 400 to control the long stroke pumping unit 101 in flow chart form using the disclosed control apparatus 200. Reference to elements in FIGS. 8 and 9 are provided for better understanding.

The control circuitry 202 (e.g., monitoring function 204) obtains operational parameters from the unit's sensors 206s, 206l, 206p. For example, the load sensor 206l communicates readings of the rod load in the stroke to the monitoring function 204 (Block 402). The speed sensor 206s communicates readings of the unit's speed in the stroke cycle 350 (Block 404), and the position sensor 206p communicates readings of the unit's position in the stroke cycle 350 (Block 406). The monitoring function 204 evaluates these reading and provides machine inputs, including current stroke position, speed, and load, to the pump controller function 208 (Block 410). Based on the machine inputs (and any operator inputs), the control circuitry 202 (e.g., pump controller function 208) determines a target upstroke speed, a target downstroke speed, and one or more target cornering speeds of the long stroke pumping unit 101 and controls the variable frequency drive 210 to achieve the operational objectives associated with the target speeds (Block 420). During operation, the capacitor bank 260 then handles the regenerative power and the stored power according to the operational positions in the stroke cycle 350 of the long stroke pumping unit (Blocks 410, 440, 450, 460).

In the process 400, the capacitor bank 260 as noted above handles the regenerative power and stored power according to the operational positions of the long stroke pumping unit in the stroke cycle 350 (Blocks 410, 440, 450, 460). At transition A after the long stroke pumping unit 101 has cornered the top of stroke and starts its downstroke in the stroke cycle 350 (Blocks 410), the variable frequency drive 210 accelerates the stroke by increasing the drive of the electric motor 140 to achieve a targeted straightway speed. Inertia, friction losses, imbalances, and other forces of the long stroke pumping unit 101 require a higher current draw from the electric motor 140 to achieve the targeted straightway speed. The capacitor bank 260 provides the addition current draw needed by the electric motor 140.

At transition B before cornering at the bottom of stroke in the stroke cycle 350 (Blocks 440), the variable frequency drive 210 slows the stroke by decreasing the drive of the electric motor 140 to achieve a set cornering speed. The inertia, friction losses, imbalances, and other forces of the long stroke pumping unit 101 act on the electric motor 140, which creates a back current fed to the variable frequency drive 210. In turn, the variable frequency drive 210 feeds the back current to the capacitor bank 260, which charges the capacitors to store electrical energy.

At transition C after the long stroke pumping unit 101 has cornered the bottom of stroke and starts its upstroke in the stroke cycle 350 (Blocks 450), the variable frequency drive 210 accelerates the stroke by increasing the drive of the electric motor 140 to achieve a targeted straightway speed. The inertia, friction losses, imbalances, and other forces of the long stroke pumping unit 101 require a higher current draw from the electric motor 140 to achieve the targeted speed. The capacitor bank 260 provides the addition current draw needed by the electric motor 140.

At transition D before cornering at the top of stroke in the stroke cycle 350 (Blocks 460), the variable frequency drive 210 decelerates the stroke by decreasing the drive of the electric motor 140 to achieve a set cornering speed. The inertia, friction losses, imbalances, and other forces of the long stroke pumping unit 101 act on the electric motor 140, which creates a back current fed to the variable frequency drive 210. In turn, the variable frequency drive 210 feeds the back current to the capacitor bank 260, which charges the capacitors to store electrical energy. The process 400 then repeats as the stroke cycle 350 repeats.

Figure 11:
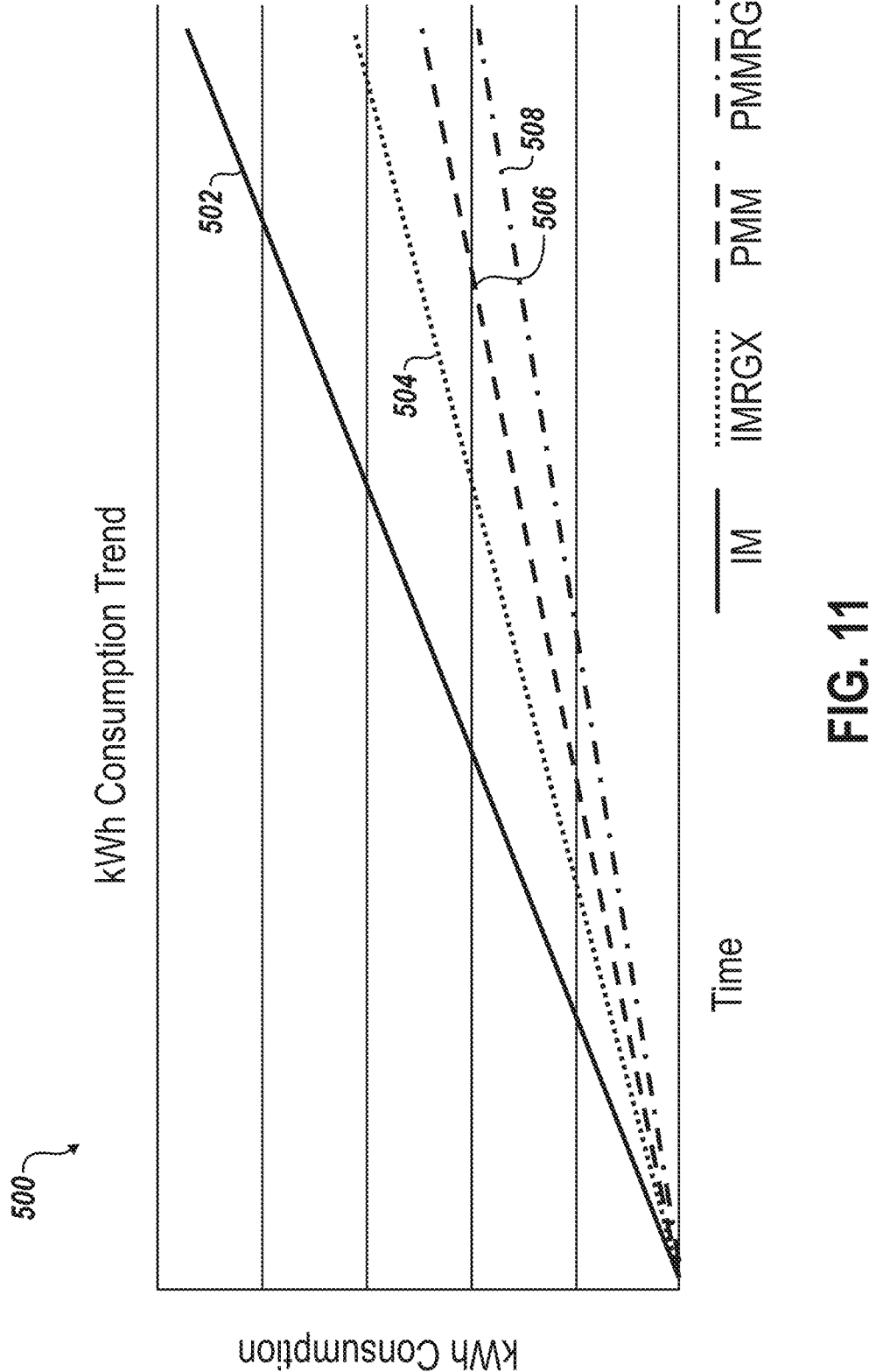
FIG. 11 illustrates a graph comparing trends for kWh consumption of different arrangements of a long stroke pumping unit.

FIG. 11 illustrates a graph comparing trends for kWh consumption of different arrangements of a long stroke pumping unit. Trendlines 502, 504, 506, 508 are shown for long stroke pumping units having different electric motors and having or lacking the disclosed control apparatus 200. As will be appreciated, these trendlines 502, 504, 506, 508 represent smoothed and averaged consumption over time because the consumption is typically ramped or stepped due to the different consumption values between the uphole and downhole portions of the pumping unit's strokes.

Trendline 502 represents the trend of the kWh consumption of an induction motor over time for a long stroke pumping unit lacking a control apparatus as disclosed herein. Here, the induction motor producing this trendline 502 is operated in a conventional manner. In contrast, trendline 504 represents the trend of the kWh consumption of an induction motor over time for a long stroke pumping unit having the disclosed control apparatus as disclosed herein. As can be seen, the induction motor operated with the disclosed control apparatus consumes less energy over time.

Trendlines 506, 508 represent the trends of the kWh consumption of permanent magnet motors over time for a long stroke pumping unit. In contrast to an induction motor, the permanent magnet motor can couple more directly to the pumping unit's components, such as the gearbox. Also, the permanent magnet motor tends to operate more efficiently over a wider range of speeds, unlike the induction motor that operates less efficiently at low speeds.

Trendline 506 represents the trend of the kWh consumption of a permanent magnet motor over time for a long stroke pumping unit lacking a control apparatus as disclosed herein. Here, the permanent magnet motor producing this trendline 506 is operated in a conventional manner. As can be seen, the permanent magnet motor on its own can reduce the power consumption due to the benefits noted above.

In contrast, trendline 508 represents the trend of the kWh consumption of a permanent magnet motor over time for a long stroke pumping unit having the disclosed control apparatus as disclosed herein. As can be seen, the permanent magnet motor operated with the disclosed control apparatus consumes even less energy over time. The variable frequency drive for the control apparatus of the present disclosure can be configured to operate either a permanent magnet motor or an induction motor primarily by adjusting the frequency of operation. In general, the variable frequency drive may operate at about 30 to 90 hertz to drive an induction motor and may operate at higher frequency to drive a permanent magnet motor.

Configurations of the present disclosure can be characterized by the following clauses:

Clause 1. A method of operating a pumping unit (101) having an electric motor (140) to reciprocate a downhole pump (PP) with a rod string (RS), the method comprising:

stroking the pumping unit (101) by driving the electric motor (140) with a variable frequency drive (210);

measuring operational parameters of the pumping unit (101) using sensors (206) associated with the pumping unit (101);

determining, based on the operational parameters, at least one straightway speed and at least one cornering speed for the strokes of the pumping unit (101);

controlling the variable frequency drive (210) to drive the electric motor (140) by:

decelerating the strokes (350) of the pumping unit (101) in a deceleration from the at least one straightway speed toward the at least one cornering speed, and accelerating the strokes (350) of the pumping unit (101) in an acceleration from the at least one cornering speed toward the at least one straightway speed;

storing regenerative power in a capacitor bank (260) in electrical connection to the variable frequency drive (210), the regenerative power being produced during the deceleration; and supplying stored power from the capacitor bank (260) to the variable frequency drive (210) to at least partially drive the electric motor (140) during the acceleration.

Clause 2. The method of Clause 1, wherein measuring the operational parameters of the pumping unit (101) using the sensors (206) associated with the pumping unit (101) comprises sensing values of a surface load associated with the pumping unit (101), a speed associated with the electric motor (140), and a surface position associated with the pumping unit (101); and wherein determining, based on the operational parameters, the at least one straightway speed and the at least one cornering speed for the strokes of the pumping unit (101) comprises:

calculating, based on the operational parameters, downhole position and downhole load associated with the downhole pump (PP); and determining the at least one straightway speed and the at least one cornering speed based on the downhole position and the downhole load determined.

Clause 3. The method of Clause 1 or 2, comprising:

determining at least one turnaround deceleration rate in the deceleration from the at least one straightway speed to the at least one cornering speed; and determining at least one turnaround acceleration rate in the acceleration from the at least one cornering speed to the at least one straightway speed.

Clause 4. The method of Clause 1, 2 or 3, wherein controlling, storing, and supplying comprises:

(i) accelerating the strokes (350) of the pumping unit (101) in a first transition (A) from a first of the at least one cornering speed toward a first of the at least one straightway speed, and supplying stored power during the acceleration for the first transition (A);

(ii) decelerating the strokes (350) of the pumping unit (101) in a second transition (B) from the first straightway speed toward a second of the at least one cornering speed, and storing regenerative power during the deceleration for the second transition (B);

(iii) accelerating the strokes (350) of the pumping unit (101) in a third transition (C) from the second cornering speed toward a second of the at least one straightway speed, and supplying stored power during the acceleration for the third transition (C); and (iv) decelerating the strokes (350) of the pumping unit (101) in a fourth transition (D) from the second straightway speed toward the first cornering speed, and storing regenerative power during the deceleration for the fourth transition (D).

Clause 5. The method of any preceding Clause, wherein driving the electric motor (140) with the variable frequency drive (210) comprises:

converting, in a rectifier stage (220) of the variable frequency drive (210), input of alternating current (AC) power from an AC power source (S) to direct current (DC) power for a DC bus (212212) of the variable frequency drive (210); and converting, in an inverter stage (240) of the variable frequency drive (210), the DC power to three-phase AC power for output to the electric motor (140).

Clause 6. The method of Clause 5, wherein storing the regenerative power in the capacitor bank (260) connected to the variable frequency drive (210) comprises storing, in the capacitor bank (260), the regenerative power passed from the electric motor (140) back through the inverter stage (240) to the DC bus (212); and wherein discharging the stored power from the capacitor bank (260) to the variable frequency drive (210) to at least partially drive the electric motor (140) comprises converting, in the inverter stage (240), the DC power on the DC bus (212) drawn from the rectifier stage (220) and the capacitor bank (260) to three-phase AC power for output to the electric motor (140).

Clause 7. The method of Clause 5 or 6, further comprising pre-charging the capacitor bank (260) of the variable frequency drive (210).

Clause 8. The method of Clause 7, wherein pre-charging the capacitor bank (260) of the variable frequency drive (210) comprises:

disconnecting the capacitor bank (260) from the DC bus (212) of the variable frequency drive (210) and connecting a pre-charging circuit (290) to the AC power source (S);

converting, with the pre-charging circuit (290), the AC power from the AC power source (S) to the DC power at a target voltage level for the capacitor bank (260); and disconnecting the pre-charging circuit (290) from the AC power source (S) and connecting the capacitor bank (260) to the DC bus (212) after pre-charging the capacitor bank (260) to the target voltage level.

Clause 9. A system used in operating a pumping unit (101) having an electric motor (140) to reciprocate a downhole pump (PP) with a rod string (RS), the system comprising:

a variable frequency drive (210) being configured to drive the electric motor (140) to stroke the pumping unit (101);

sensors (206) being configured to measure operational parameters associated with the strokes of the pumping unit (101);

control circuitry (200) in operational connection to the variable frequency drive (210) and the sensors (206), the control circuitry (200) being configured to:

determine, based on the operational parameters, at least one straightway speed and at least one cornering speed for the strokes (350) of the pumping unit (101); and control the variable frequency drive (210) to drive the electric motor (140) to stroke the pumping unit (101) with according to the at least one straightway speeds and the at least one cornering speeds; and a capacitor bank (260) in electrical connection to the variable frequency drive (210) and being configured to:

store regenerative power produced in response to the variable frequency drive (210) decelerating the strokes (350) of the pumping unit (101) in a deceleration from the at least one straightway speed toward the at least one cornering speed; and supply stored power to the variable frequency drive (210) in response to the variable frequency drive (210) accelerating the strokes (350) of the pumping unit (101) in an acceleration from the at least one cornering speed toward the at least one straightway speed.

Clause 10. The system of Clause 9, wherein the sensors (206) comprise:

a load sensor (2061) configured to measure load associated with the rod string (RS);

a position sensor (206p) configured to measure position associated with the rod string (RS); and a speed sensor (206s) configured to measure speed associated with the rod string (RS).

Clause 11. The system of Clause 9 or 10, wherein to determine, based on the operational parameters, the at least one straightway speed and the at least one cornering speed, the control circuitry (200) is configured to:

calculate, based on the operational parameters, position and load associated with the downhole pump (PP); and determine the at least one straightway speed and the at least one cornering speed based on the determined position and load.

Clause 12. The system of Clause 9, 10 or 11, wherein the control circuitry (200) is configured to:

determine at least one turnaround deceleration rate for the deceleration from the at least one straightway speed to the at least one cornering speed; and determine at least one turnaround acceleration rate for the acceleration from the at least one cornering speed to the at least one straightway speed.

Clause 13. The system of any one of Clauses 9 to 12, wherein to control the variable frequency drive (210) to drive the electric motor (140), the control circuitry (200) is configured to:

(i) accelerate the strokes (350) of the pumping unit (101) in a first transition (A) from a first of the at least one cornering speed toward a first of the at least one straightway speed, the capacitor bank (260) being configured to supply stored power during the acceleration for the first transition (A);

(ii) decelerate the strokes (350) of the pumping unit (101) in a second transition (B) from the first straightway speed toward a second of the at least one cornering speed, the capacitor bank (260) being configured to store regenerative power during the deceleration for the second transition (B);

(iii) accelerate the strokes (350) of the pumping unit (101) in a third transition (C) from the second cornering speed toward a second of the at least one straightway speed, the capacitor bank (260) being configured to supply stored power during the acceleration for the third transition (C); and (iv) decelerate the strokes (350) of the pumping unit (101) in a fourth transition (D) from the second straightway speed toward the first cornering speed, the capacitor bank (260) being configured to store regenerative power during the deceleration for the fourth transition (D).

Clause 14. The system of any one of Clauses 9 to 13, wherein the variable frequency drive (210) comprises:

an input (211) being configured to connect to an alternating current (AC) power source (S);

an output (213) being configured to connect to the electric motor (140);

a rectifier stage (220) connected to the input and being configured to convert AC power from the AC power source (S) to direct current (DC) power on a DC bus (212);

a DC bus filter (230) connected between the DC bus (212) and being configured to filter the DC power of the DC bus (212); and an inverter stage (240) connected to the DC bus (212) and being configured to convert the DC power to three-phase AC power for the output to the electric motor (140);

wherein the capacitor bank (260) comprises one or more capacitors connected to the DC bus (212), the capacitor bank (260) being configured to store regenerative power on the DC bus (212) from the inverter stage (240) as stored DC power, the capacitor bank (260) being configured to supply the stored DC power to the DC bus (212) for conversion to the three-phase AC power to drive the electric motor (140), optionally wherein the three-phase AC power to drive the electric motor (140) is drawn from both the capacitor bank (260) and from the AC power source (S) during at least one of the second and fourth transitions (D).

Clause 15. The system of Clause 14, wherein the control circuitry (200) comprises a pre-charging circuit (290) configured to pre-charge the one or more capacitors of the capacitor bank (260) from the AC power of the AC power source (S).

Clause 16. The system of Clause 15, wherein the pre-charging circuit (290) comprises:

charging contacts (254) selectively connected between the AC power source (S) and the pre-charging circuit (290);

an operating contact (258) selectively connected between a positive line of the DC capacitor bank (260) and the DC bus (212); and a converter connected between the charging contacts (254) and the DC capacitor bank (260), wherein the control circuitry (200) is operable in a pre-charging mode to selectively open the operating contact (258) and close the charging contacts (254) in which the converter is configured to convert the AC power from the AC power source (S) to a single-phase DC voltage that charges the DC capacitor bank (260); and wherein the control circuitry (200) is operable in an operating mode to selectively open the charging contacts (254) and close the operating contact (258) in which the DC capacitor bank (260) is electrically connected to the DC bus (212).

Clause 17. A pumping unit (101) to reciprocate a rod string (RS) for a downhole pump (PP) disposed in a well, the pumping unit (101) comprising:

an electric motor (140); and a system according to any one of Clauses 9 to 16.

Clause 18. The pumping unit (101) of Clause 17, comprising:

a tower (110);

a counterweight (120) being movable along the tower; and a belt (116) disposed on the tower (110) and being connected between the counterweight (120) and the rod string (RS), wherein the electric motor (140) is configured to reciprocate the belt (116) in strokes (350) of the pumping unit (101).

The foregoing description of preferred and other embodiments is not intended to limit or restrict the scope or applicability of the inventive concepts conceived of by the Applicants. It will be appreciated with the benefit of the present disclosure that features described above in accordance with any configuration or aspect of the disclosed subject matter can be utilized, either alone or in combination, with any other described feature, in any other configuration or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

The invention claimed is:

1. A method of operating a pumping unit having an electric motor to reciprocate a downhole pump with a rod string, the method comprising:

stroking the pumping unit in strokes by driving the electric motor with a variable frequency drive;

measuring operational parameters of the pumping unit using sensors associated with the pumping unit;

determining, based on the operational parameters, at least one straightway speed and at least one cornering speed for the strokes of the pumping unit;

controlling the variable frequency drive to drive the electric motor by:

decelerating the strokes of the pumping unit in a deceleration from the at least one straightway speed toward the at least one cornering speed, and accelerating the strokes of the pumping unit in an acceleration from the at least one cornering speed toward the at least one straightway speed;

storing regenerative power in a capacitor bank in electrical connection to the variable frequency drive, the regenerative power being produced during the deceleration; and supplying stored power from the capacitor bank to the variable frequency drive to at least partially drive the electric motor during the acceleration.

2. The method of claim 1, wherein measuring the operational parameters of the pumping unit using the sensors associated with the pumping unit comprises sensing values of a surface load associated with the pumping unit, a speed associated with the electric motor, and a position associated with the pumping unit.

3. The method of claim 1, wherein determining, based on the operational parameters, the at least one straightway speed and the at least one cornering speed for the strokes of the pumping unit comprises:

calculating, based on the operational parameters, downhole position and downhole load associated with the downhole pump; and determining the at least one straightway speed and the at least one cornering speed based on the downhole position and the downhole load determined.

4. The method of claim 1, comprising:

determining at least one turnaround deceleration rate in the deceleration from the at least one straightway speed to the at least one cornering speed; and determining at least one turnaround acceleration rate in the acceleration from the at least one cornering speed to the at least one straightway speed.

5. The method of claim 1, wherein controlling, storing, and supplying comprises:

(i) accelerating the strokes of the pumping unit in a first transition from a first of the at least one cornering speed toward a first of the at least one straightway speed, and supplying stored power during the acceleration for the first transition;

(ii) decelerating the strokes of the pumping unit in a second transition from the first straightway speed toward a second of the at least one cornering speed, and storing regenerative power during the deceleration for the second transition;

(iii) accelerating the strokes of the pumping unit in a third transition from the second cornering speed toward a second of the at least one straightway speed, and supplying stored power during the acceleration for the third transition; and (iv) decelerating the strokes of the pumping unit in a fourth transition from the second straightway speed toward the first cornering speed, and storing regenerative power during the deceleration for the fourth transition.

6. The method of claim 1, wherein driving the electric motor with the variable frequency drive comprises:

converting, in a rectifier stage of the variable frequency drive, input of alternating current (AC) power from an AC power source to direct current (DC) power for a DC bus of the variable frequency drive; and converting, in an inverter stage of the variable frequency drive, the DC power to three-phase AC power for output to the electric motor.

7. The method of claim 6, wherein storing the regenerative power in the capacitor bank connected to the variable frequency drive comprises storing, in the capacitor bank, the regenerative power passed from the electric motor back through the inverter stage to the DC bus; and wherein discharging the stored power from the capacitor bank to the variable frequency drive to at least partially drive the electric motor comprises converting, in the inverter stage, the DC power on the DC bus drawn from the rectifier stage and the capacitor bank to three-phase AC power for output to the electric motor.

8. The method of claim 6, further comprising pre-charging the capacitor bank of the variable frequency drive by:

disconnecting the capacitor bank from the DC bus of the variable frequency drive and connecting a pre-charging circuit to the AC power source;

converting, with the pre-charging circuit, the AC power from the AC power source to the DC power at a target voltage level for the capacitor bank; and disconnecting the pre-charging circuit from the AC power source and connecting the capacitor bank to the DC bus after pre-charging the capacitor bank to the target voltage level.

9. The method of claim 6, wherein driving the electric motor comprises:

measuring one or more of a voltage level, a current level, and a temperature level associated with at least one of the DC bus of the variable frequency drive and the capacitor bank; and detecting, based on the measurement, one or more of a voltage fault, a current fault, and a temperature fault.

\* \* \* \* \*